US011351089B2

(12) United States Patent
Alford et al.

(10) Patent No.: US 11,351,089 B2
(45) Date of Patent: Jun. 7, 2022

(54) CARRIER FOR FREEZING, STORING, TRANSPORTING, AND THAWING BIOLOGICAL PRODUCTS STORAGE BAGS

(71) Applicant: W. L. Gore & Associates, Inc., Newark, DE (US)

(72) Inventors: Joseph T. Alford, Belcamp, MD (US); Lauren Myrick, Lincoln University, PA (US)

(73) Assignee: W. L. Gore & Associates, Inc., Newark, DE (US)

(*) Notice: Subject to any disclaimer, the term of this patent is extended or adjusted under 35 U.S.C. 154(b) by 25 days.

(21) Appl. No.: 17/041,613

(22) PCT Filed: Mar. 29, 2018

(86) PCT No.: PCT/US2018/025272
§ 371 (c)(1),
(2) Date: Sep. 25, 2020

(87) PCT Pub. No.: WO2019/190535
PCT Pub. Date: Oct. 3, 2019

(65) Prior Publication Data
US 2021/0007932 A1    Jan. 14, 2021

(51) Int. Cl.
*B65D 63/10*    (2006.01)
*A61J 1/16*    (2006.01)
*A61J 1/10*    (2006.01)

(52) U.S. Cl.
CPC .. *A61J 1/16* (2013.01); *A61J 1/10* (2013.01)

(58) Field of Classification Search
CPC .......... A61J 1/16; A61J 1/10; B65D 21/0233; B65D 21/0234; A61B 50/00; A61B 50/30; A61B 50/31
USPC ........................................ 206/591, 509, 587
See application file for complete search history.

(56) References Cited

U.S. PATENT DOCUMENTS

| 2007/0209960 | A1  | 9/2007 | Leoncavallo et al. |
| 2010/0101974 | A1* | 4/2010 | Eskenazi ............. B65D 25/101 206/591 |
| 2016/0066998 | A1* | 3/2016 | Knowlton ............. A61B 50/33 206/438 |

OTHER PUBLICATIONS

International Search Report and Written Opinion from International Application No. PCT/US2018/025272 dated Dec. 5, 2018.

* cited by examiner

*Primary Examiner* — King M Chu
(74) *Attorney, Agent, or Firm* — Greenberg Traurig, LLP

(57) ABSTRACT

A carrier for a storage bag is disclosed. The carrier includes a base and a lid that define an interior region in a closed configuration. The base and lid are configured to retain the storage bag and tubes of the storage bag within the interior region in the closed configuration. A distance between the base and lid in the closed configuration is adaptable between a contacting position and a floating position to allow for maximum contact of the storage bag with the base and the lid.

12 Claims, 17 Drawing Sheets

CARRIER FOR FREEZING, STORING, TRANSPORTING, AND THAWING BIOLOGICAL PRODUCTS STORAGE BAGS

FIELD

The present disclosure relates to carriers for flexible containers and, in particular, to carriers for freezing, storing, and transporting thawing biological product storage bags.

BACKGROUND

Single-use flexible containers are used for transportation, storage, freezing, and thawing of materials, such as biologics. Some such containers are flexible bags that are made out of plastic film. The bags may be used for storage, particularly in cryopreservation applications. The bags are typically disposable to reduce risk of cross contamination and the need for cleaning validation.

In biologic applications, bulk drug substances are stored and transported in flexible storage bags. The contents of the bags can be frozen to maintain stability over storage time. When the stored fluid is frozen, typically at −80° C. (may require temperatures as low as −160° C.), the bags become fragile and may be susceptible to damage that may impact the performance of the bag. The bags are thus placed in carriers for freezing and/or subsequent storage and/or transportation. Because the bags may be frozen while in the carriers, useful carriers should allow efficient heat transfer to the bags and the contents therein. But, the carriers also must be sufficiently rigid to protect the bag, including protecting components such as ports and tubes.

Conventionally, a base and a lid of a carrier can only be mated together in a single configuration. In these conventional carriers, mechanical stops (e.g., nuts and bolts, pins, etc.) secure the base to the lid such that the relative positioning of the base and lid is fixed, which in turn makes the carrier rigid enough to provide the needed protection for the storage bag. While the mechanical stop provides the needed rigidity to the carrier, the mechanical stop also prevents the carrier from conforming to differences in the size or shape of the bag due to differences in fill levels. For example, if a mechanical stop fixes the relative positions of the lid and base, thus forming a constant internal volume, the carrier may contact both the top and bottom surfaces of a completely filled bag, but the same carrier will not contact both the top and bottom surfaces of an under-filled bag. The difference in the carrier internal volume and the volume of the under-filled bag causes a gap between the carrier and the top of the under-filled bag. The gap acts as an insulator, inhibiting heat transfer between an external environment and the fluid contained in the storage bag, which increases the freeze time and/or the thaw time of the fluid and can negatively affect the biologic being frozen or thawed. In addition, some traditional carriers achieve close contact between the carrier and the edges of the bag by directing tubes attached to the bag (e.g., filling and draining tubes) to the outside of the carrier. Thus, the tubes are not adequately protected and are susceptible to breaking during transport.

A carrier for a flexible container that provides efficient heat transfer through the container, adaptable support for a variety of fill levels, and protection for tubes attached to the flexible container is therefore desirable.

SUMMARY

The present disclosure provides devices and methods for containing and protecting flexible containers, including storage bags, which have one or more components that are fragile and need to be protected during freezing, thawing, storing, and transporting, such as during shipment of the flexible containers.

According to some embodiments, the disclosure describes a carrier for a storage bag that includes a base and a lid. In some examples, the base and lid each include two or more supports that are configured to contact a peripheral region of a storage bag to reduce stress at edges of the storage bag. In various examples, a distance between the lid and base in the closed configuration is adaptable to a fill volume of the storage bag to allow for maximum contact of the storage bag with the base and lid in the closed configuration.

In various examples, the distance between the base and the lid is adaptable in the closed configuration between a contacting position and a floating position, where a peripheral edge region of the lid contacts a peripheral edge region of the base in the contacting position, and where the peripheral edge region of the lid is spaced apart from the peripheral edge region of the base in the floating position. In certain cases, one of the peripheral edge region of the base or the peripheral edge region of the lid includes a trough, and the other of the peripheral edge region of the base or the peripheral edge region of the lid rests in the trough in the contacting position.

In certain examples, each support includes a contact surface having a slope and configured to contact a peripheral region of the storage bag. In some embodiments, a profile of each contact surface is arcuate shaped. In various embodiments, a profile of each contact surface is complimentary to a profile of a frozen storage bag. According to certain embodiments, adjacent supports in the base are spaced apart by a gap such that a portion of the peripheral region of the storage bag does not contact the supports.

In certain embodiments, the base and/or the lid include a channel, where the channel is configured to contain one or more tubes of a storage bag within the carrier in a closed configuration. In various optional embodiments, the base further includes a base tube guiding portion and the lid further includes a lid tube guiding portion, where the base tube guiding portion and the lid tube guiding portion together define a tube guide for restricting motion of a tube in the closed configuration. In some cases, a shape of the base tube guiding portion is complimentary to a shape of the lid tube guiding portion. In various aspects, a geometry of the tube guide is different from a geometry of the tubes. In some embodiments, the lid tube guiding portion and the base tube guiding portion each comprise at least one peak and at least one depression.

According to certain embodiments, the base and the lid each are formed of high-density polyethylene. In various cases, the carrier further includes two or more apertures for receiving adjustable connecting members for connecting the base to the lid. In some aspects, the adjustable connecting members include adjustable tie members.

According to various embodiments, the disclosure relates to a carrier for a storage bag that includes a base and a lid, where the base and the lid define an interior region in a closed configuration, where the lid and base are configured to retain tubes of a storage bag within the interior region in the closed configuration, and where a distance between the base and lid is adaptable in the closed configuration between a contacting position and a floating position.

In some embodiments, the carrier further includes a channel in the interior region that is configured to retain the tubes of the storage bag within the interior region. In some examples, the base further includes a base tube guiding portion and the lid further includes a lid tube guiding portion, where the lid guiding portion and the base guiding portion together define a tube guide for restricting movement of a tube in the closed configuration. In certain embodiments, the lid tube guiding portion is spaced apart from the base tube guiding portion in the floating position, and the lid tube guiding portion contacts the base tube guiding portion in the contacting position. In various aspects, a geometry of the tube guide is different from a geometry of the tubes.

In some cases, peripheral edge regions of the base and lid are spaced apart in the floating position, and the peripheral edge regions of the base and lid are in contact in the contacting position. In various examples, the carrier further includes supports within the base having sloping contact surfaces configured to contact peripheral regions of the storage bag. In certain embodiments, adjacent supports are spaced apart by a gap such that a portion of the edge of the storage bag does not contact the supports.

According to various embodiments, the disclosure relates to a method of protecting a storage bag at low temperature, the method including maintaining a carrier described herein in a closed configuration with a storage bag disposed therein, where the storage bag contains a liquid medium or a frozen medium; and controlling the temperature around the carrier thereby causing the liquid medium to freeze, to maintaining the frozen medium in a frozen state, or causing the frozen medium to thaw. Controlling the temperature around the carrier may include lowering the temperature around the carrier to below a freezing point of the liquid medium and maintaining the temperature below the freezing point of the liquid medium until the liquid medium is frozen. Alternatively, controlling the temperature around the carrier may include raising the temperature around the carrier to a point above a melting point of the frozen medium and maintaining the temperature above the freezing point of the frozen medium until the frozen medium has thawed.

According to other embodiments, the disclosure relates to a method of protecting a storage bag including positioning the storage bag in a base of a carrier disclosed herein where the storage bag contacts the base; positioning the base and a lid in a closed configuration, where the storage bag contacts the lid, and where the lid is in a contacting or a floating position; and connecting the lid and the base through an adjustable connecting system. The base may include two or more supports, and the storage bag may contact the two or more supports at a peripheral region of the storage bag. If the storage bag includes one or more tubes, the method may further include positioning the tubes in a channel formed by the base and lid. In some examples, the storage bag includes one or more tubes, and the base and lid form a tube guide, and the method further includes positioning the tubes proximate the tube guide. In some examples, the method includes adding a fluid to the storage bag before or after the bag is positioned in the base of the carrier.

The terms "disclosure," "the disclosure," "this disclosure" and "the present disclosure," as used in this document, are intended to refer broadly to all of the subject matter of this patent application and the claims below. Statements containing these terms should be understood not to limit the subject matter described herein or to limit the meaning or scope of the patent claims below. Covered embodiments of the disclosure are defined by the claims, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Figure 1:
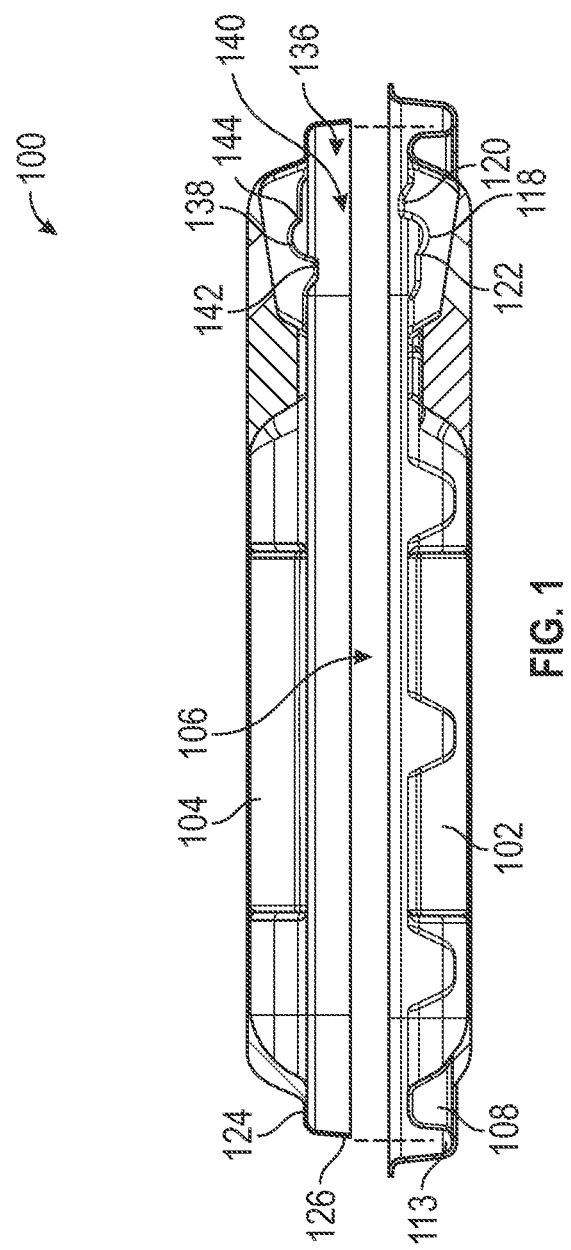
FIG. 1 is a sectional view of a carrier including a base and a lid according to some embodiments described herein.

Described herein are carriers for flexible containers, such as storage bags, having one or more components that are fragile and/or need to be protected during freezing, thawing, storage, or transporting, such as during shipment of the storage bags. Also described herein are methods of assembling the carriers for the storage bags and methods of freezing and thawing the contents of the storage bags.

The carriers described herein include a base and a lid, where the base and lid include peripheral edge regions and central recessed regions. In a closed configuration (i.e., when the lid is assembled with the base), the central recessed regions combine to define an interior region for retaining a flexible storage bag between the base and the lid. The relative positions of the lid and base, and thus the height of the central recessed region, are adaptable to the fill volume of the retained storage bag, so that in the closed configuration, the lid and base both contact the storage bag irrespective of the bag fill volume. For example, at a minimum fill volume, the storage bag rests on the base, and the lid contacts the top surface of the storage bag and also may contact the base (e.g. at the peripheral edge regions). At a higher fill volume, however, the storage bag rests on the base, and the lid contacts the top surface of the storage bag but may not contact the base, i.e., the lid may "float" off the base. Being adaptable to a fill volume allows the carriers to contact the top and bottom surfaces of a retained storage bag at any fill volume to provide support and efficient heat transfer (e.g. for freezing or thawing the bag contents). The carriers also include structures such as contoured contact surfaces for supporting the storage bags, and in particular for supporting the peripheral regions of the bags. The carriers further include structures such as channels and guides for containing and protecting any tubes attached to the bags.

By "adaptable" it is meant that for a given embodiment, the position of one element with respect to another element may vary under different circumstances. For example, in the carriers disclosed herein, for a given embodiment, the distance between the base and the lid in a closed configuration may vary depending on the fill volume of a storage bag contained within the carrier in the closed configuration.

By "contacting position" it is meant that the lid of a carrier contacts and is supported by the base in a closed configuration.

By "floating position" is it meant that the lid of a carrier does not contact, or is not supported by, the base in a closed configuration. A lid may float if the thickness of a storage bag retained within the carrier is greater than the distance between the recessed portions of the lid and base when the lid contacts the base in a closed configuration.

Storage bags are used for transporting and storing materials, such as biologics. Such containers are typically flexible bags made out of plastic film. The bags may be used for transportation and/or storage, particularly in low temperature applications, such as but not limited to cryopreservation applications. The bags may be disposable to reduce risk of cross contamination and the need for cleaning validation. In some applications, the contents of the storage bags are frozen. At low temperatures, such as those required for freezing, the bags become fragile and may be susceptible to damage that can affect the performance of the bag. The bags are thus placed in protective carriers for freezing, subsequent storage and/or transportation, and thawing.

The base and/or the lid may be constructed from various materials suitable for protecting a storage bag, and particularly for freezing and thawing the contents of a storage bag and protecting a storage bag at low temperatures. In some examples, the base and/or the lid are constructed from high-density polyethylene (HDPE), although various other suitable materials may be utilized. In some embodiments, the base and/or the lid may be constructed from a relatively thin material. As described further herein, if desired, the base and/or lid may include strengthening features including but not limited to, ribbing, indents, and various other suitable features.

In a closed configuration, the base peripheral edge region and the lid peripheral edge region are substantially aligned. The lid peripheral edge region may rest on the base peripheral edge region such that the base directly supports the lid. Alternatively, the lid peripheral edge region may vertically overlap the base peripheral edge region without contacting it, and another portion of the base may contact another portion of the lid to provide direct support for the lid.

A closed configuration where the lid rests on the base and the base provides at least some direct support for the lid is referred to herein as a "contacting position." In some embodiments, the contacting position corresponds with a minimum fill volume of a storage bag that can be retained by the carrier. That is, in the contacting position, a bag having a minimum fill volume will just fill the central recessed regions of the lid and the base with the contacts the bottom surface of the storage bag, and the lid contacting the top surface of the storage bag.

In a closed configuration the lid alternatively may be in a "floating position." in contrast to a contacting position, in a floating position the lid rests on a storage bag within the central recessed regions and is not directly supported by the base. In a floating position, the lid peripheral edge region may vertically overlap the base peripheral edge region, but does not rest on the base peripheral edge region. In some embodiments in a floating position, the base peripheral edge region and the lid peripheral edge region are spaced apart vertically, i.e. do not overlap vertically. In such embodiments, the lid and base may be tethered by suitable attachment means, such as but not limited to zip ties, wires, o-rings, adjustable clamps, or any other element that achieves attachment.

In some embodiments, a base peripheral edge region includes a trough in which at least a portion of the lid peripheral edge region may sit (in a contacting position) or into which at least a portion of the lid peripheral edge region may extend (in a contacting position where a portion of the base other than the peripheral edge provides support for the lid, or in a floating position). In other embodiments, a lid peripheral edge region includes a trough in which at least a portion of the base peripheral edge region may sit or may extend. The lid peripheral edge region is referred to as a trough, although it should be understood that a trough in the lid peripheral edge region would be inverted as compared to a trough in the base peripheral edge region so that it can accept a portion of the base peripheral edge region. In some examples, a deeper trough may correspond to a smaller minimum fill volume that the carrier can retain while a shallower trough may correspond to a larger minimum fill volume that the carrier can retain.

In some embodiments, the carrier disclosed herein is intended for use with a storage bag that is substantially flat when empty and expands as it fills. In some examples, a storage bag has a cross-section that increases in thickness as the bag fills. In some examples a partially full or completely full bag has a cross-section that has a maximum thickness in a middle region and is curved at the edges. In some examples, at an intermediate fill volume, a bag resting on a horizontal surface will have top and bottom surfaces that include substantially flat, planar regions and a peripheral region that is curved from the flat region of the top surface to the flat surface of the bottom surface. The relative sizes of the flat regions and the peripheral region will vary with the fill volume of the bag, with a less full bag having a smaller peripheral region (more of the top and bottom surfaces are planar) and a more full bag having a larger peripheral region (less of the top and bottom surface are planar). In some examples, at a maximum fill volume, a bag might have a nearly oval shaped cross-section. The peripheral region of the bag may experience more stress than the flat regions, so is more at-risk for failure than the flat regions. In some embodiments, the carriers disclosed herein include structures to support the peripheral region of a bag.

In some embodiments, the base includes two or more supports that are configured to contact a peripheral region of a storage bag. Similar to the base, the lid may also include two or more supports that are configured to contact the peripheral region of the storage bag. For example, in some embodiments, the base and/or the lid may include two, three, four or more supports. In some embodiments, the supports may be omitted from the base and/or the lid as desired. The supports of the base and similarly the supports of the lid reduce stress at edges and/or corners of the storage bag. Each support includes a contact surface that contacts at least a portion of the peripheral region of the storage bag. In certain examples, each contact surface has the same slope; however, in other examples, the slope of one contact surface may be different from the slope of another contact surface. In some examples, a profile of each contact surface is arcuate-shaped. In various embodiments, a profile of the contact surface of each support is complimentary to a profile of a portion of the peripheral region of the storage bag when the storage bag is frozen in the absence of a carrier. The supports may be discontinuous in the central recessed regions and adjacent supports may be separated by a gap. In some embodiments, gaps between adjacent supports are configured to receive corners of the storage bag and the supports contact the peripheral region of the storage bag such that the storage bag is only supported at its strongest points (e.g., not in the corners).

In some embodiments, the carrier disclosed herein provides efficient heat transfer for freezing and thawing the contents of a storage bag inside the carrier and for maintaining the contents in a frozen state. At different fill levels, a bag inside the carrier will have different thicknesses, with a less filled bag being thinner and a more filled bag being thicker. In various embodiments, the distance between the lid and base is adaptable to a fill volume of the storage bag to allow for maximum contact of the storage bag with the base and lid. In some examples, for a less filled bag, the peripheral edge region of the lid may rest on the peripheral edge region of the base or may overlap the peripheral edge region of the base without resting on it. In other examples, for a more filled bag, the lid may separate from the base, that is, the peripheral edge regions of the lid and the base do not touch or overlap vertically. Where the lid does not rest on the base, the lid may rest on the top of the contained storage bag. In such embodiments, the lid and base may be tethered by suitable attachment means, such as but not limited to zip ties. In other words, the base and lid accommodate a range of fill volumes of the storage bag while advantageously maintaining contact with the storage bag surfaces so as to inhibit formation of insulative gaps.

Maintaining contact with the storage bag allows for better heat transfer between the storage bag and the carrier, for example, by minimizing the formation of insulating air pockets between the storage bag and the carrier. Better heat transfer may reduce the time required for freezing and/or thawing the liquid in the storage bag and may improve the uniformity of the freezing and/or thawing process. Maintaining contact with the storage bag also restrains the fluid in the storage bag such that the fluid freezes at a flat or minimal angle. In some embodiments, the carrier maintains the bag in a substantially horizontal, substantially planar position during freezing, irrespective of the bag fill level. Such positioning minimizes or eliminates headspace formation above the fluid, which would otherwise adversely affect the freezing and thawing performance of the storage bag.

In some embodiments, the carrier described herein protects tubing associated with a flexible storage bag, including fill tubing, sampling tubing, and/or drainage tubing. In various embodiments, the carrier includes a channel that is configured to contain one or more tubes of the storage bag within the carrier when the base and lid are in a closed configuration. In some examples, the channel may retain the tube(s) within the carrier such that they do not pop out of the carrier during transport and break. In various embodiments, the channel is a separate region in the carrier from the area where the storage bag is retained such that the tubes do not contact the bag during storage and/or transit. In some examples, a base channel portion of the base and/or a lid channel portion of the lid define the channel. In various embodiments, a depth of the base channel portion and/or the lid channel portion is less than a depth of the central recessed regions of the base and lid, respectively, such that the channel is configured to only accommodate the tubes. In other words, the depth of the channel does not accommodate the storage bag in some embodiments. In some aspects, a depth of the base channel portion and/or the lid channel portion (and thus a depth of the channel) may be varied along a length of the channel to further limit movement of the tubes within the channel. As one non-limiting example, in some cases, a shallower depth of the channel may be adjacent to an entry point of the tubes into the channel compared to other regions of the channel. As another non-limiting example, in various cases, a depth of the channel may be shallower in one corner of the channel compared to a depth of the channel in another corner of the channel.

In some optional embodiments, the carrier also or alternatively includes at least one tube guide for restricting motion of the tube(s) when the base and lid are in the closed configuration. Compared to the channel that accommodates one or more tubes, each tube guide accommodates a single tube associated with the storage bag. The tube guide includes a narrow aperture through which the single tube extends. Because the aperture is narrower and accommodates the single tube, the tube guide restricts movement of the tube within the carrier to a greater extent than the channel. In addition, compared to the channel, multiple tube guides hold tubes apart from each other (i.e., each tube can be retained in its own tube guide). Such separation and restriction of movement may further protect the tubes, particularly at low temperatures when the tubes may become fragile.

In various embodiments, the base includes a base tube guiding portion and the lid includes a lid tube guiding portion that together define the tube guide. The base tube guiding portion includes a peak and a depression that partially form the narrow aperture of the tube guide. A profile of the base tube guiding portion is arcuate-shaped in some embodiments; however, in other examples, the profile may have various other shapes as desired. Optionally, the profile of the base tube guiding portion may be different from a profile of the tube(s) of the storage bag. Similar to the base tube guiding portion, the lid tube guiding portion may include a peak and a depression that partially form the narrow aperture of the tube guide. In some embodiments, a profile of the lid tube guiding portion is arcuate-shaped; however, in other examples, the profile may have various other shapes as desired. In optional examples, the profile of the lid tube guiding portion may be different from a profile of the tube. In certain cases, the shape of the lid tube guiding portion is complimentary to the shape of the base tube guiding portion such that peaks of the lid tube guiding portion are aligned with depressions of the base tube guiding portion and depressions of the lid tube guiding portion are aligned with peaks of the base tube guiding portion, and the combined peaks and depressions form a channel that can contain a tube. In some aspects, a peak of the lid tube guiding portion may contact a depression of the base tube guiding portion. In other examples, the peaks and depressions are spaced apart from one another. In certain embodiments, the tube guide restricts motion of the tube(s) at any position of the lid relative to the base in the closed configuration (i.e., in the contacting position, floating position, or any other position). In various examples where the base tube guiding portion and the lid tube guiding portion are spaced apart, a gap defined between the base tube guiding portion and the lid tube guiding portion may be sized to prevent the tube(s) from becoming dislodged from the tube guide. For example, in some embodiments, the diameter of a tube within the tube guide is greater than the distance between facing tube guiding portions so the tube remains within the tube guide even if there is a gap between the base tube guiding portion and the lid tube guiding portion. The base tube guiding portion and/or the lid tube guiding portion may contact the tube(s) of the storage bag, although they need not.

FIGS. 1-9 illustrate an embodiment of a carrier 100 including a base 102 and a lid 104. In various embodiments, a storage bag (not illustrated in FIGS. 1-9) can be retained in an interior space 106 of the carrier 100 between the base 102 and lid 104 when the base 102 and lid 104 are in a closed configuration as illustrated in FIG. 1.

Referring to FIGS. 1-5, the base 102 includes a peripheral edge region 108 extending around a perimeter of the base 102. In the embodiment shown in FIGS. 1-5, the peripheral edge region 108 defines a trough 113. A peripheral edge region 124 of the lid 104 is positionable within the trough 113 when the base 102 and lid 104 are in the closed configuration. A depth of the trough 113 corresponds with a minimum fill volume of the storage bag that can be retained by the carrier 100 while maintaining contact between the base 102 and the storage bag as well as between the lid 104 and the storage bag.

Figure 2:
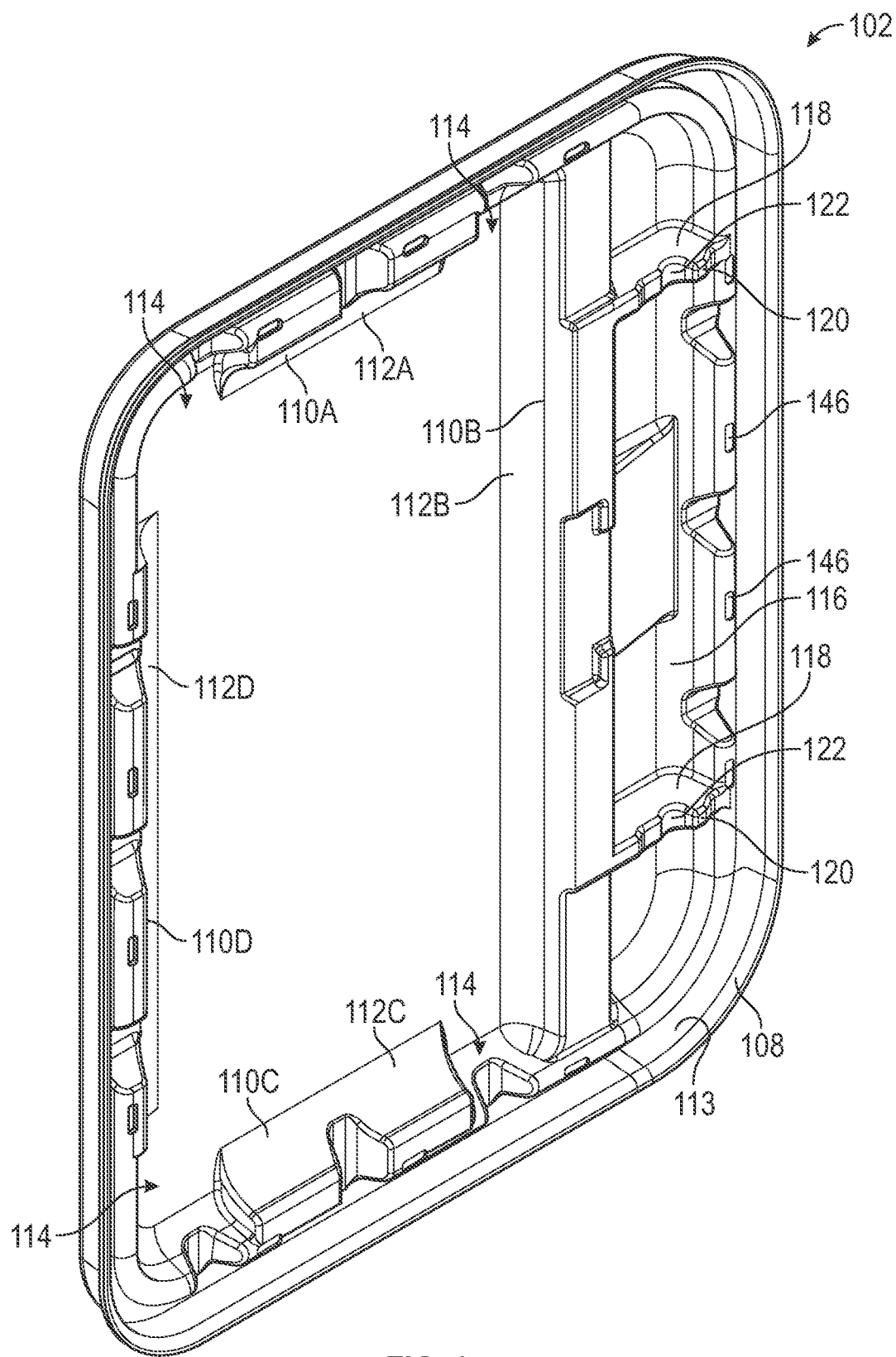
FIG. 2 is a perspective view of the base of FIG. 1.
Figure 3:
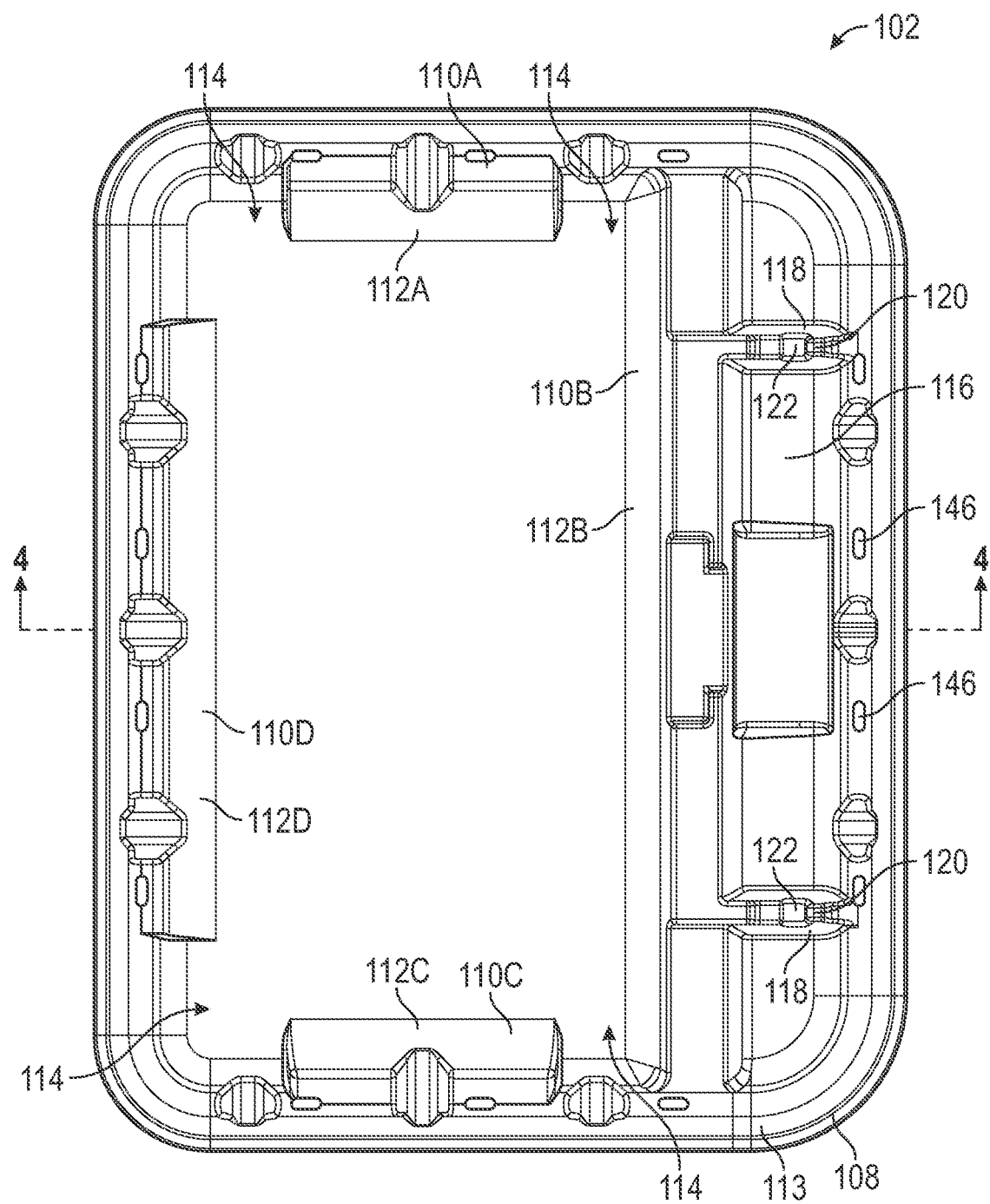
FIG. 3 is a top view of the base of FIG. 1.
Figure 4:
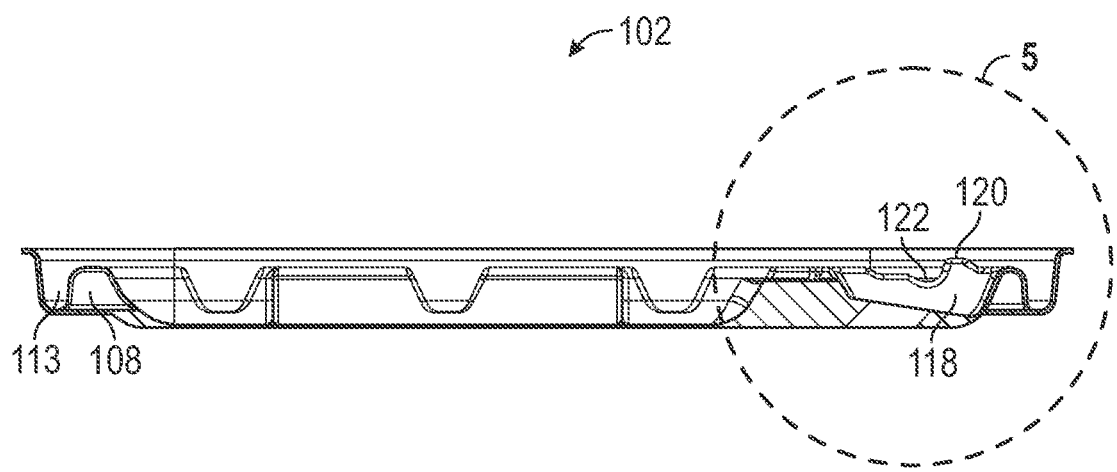
FIG. 4 is a sectional view of the base of FIG. 1 taken along line 4-4 in FIG. 3.
Figure 5:
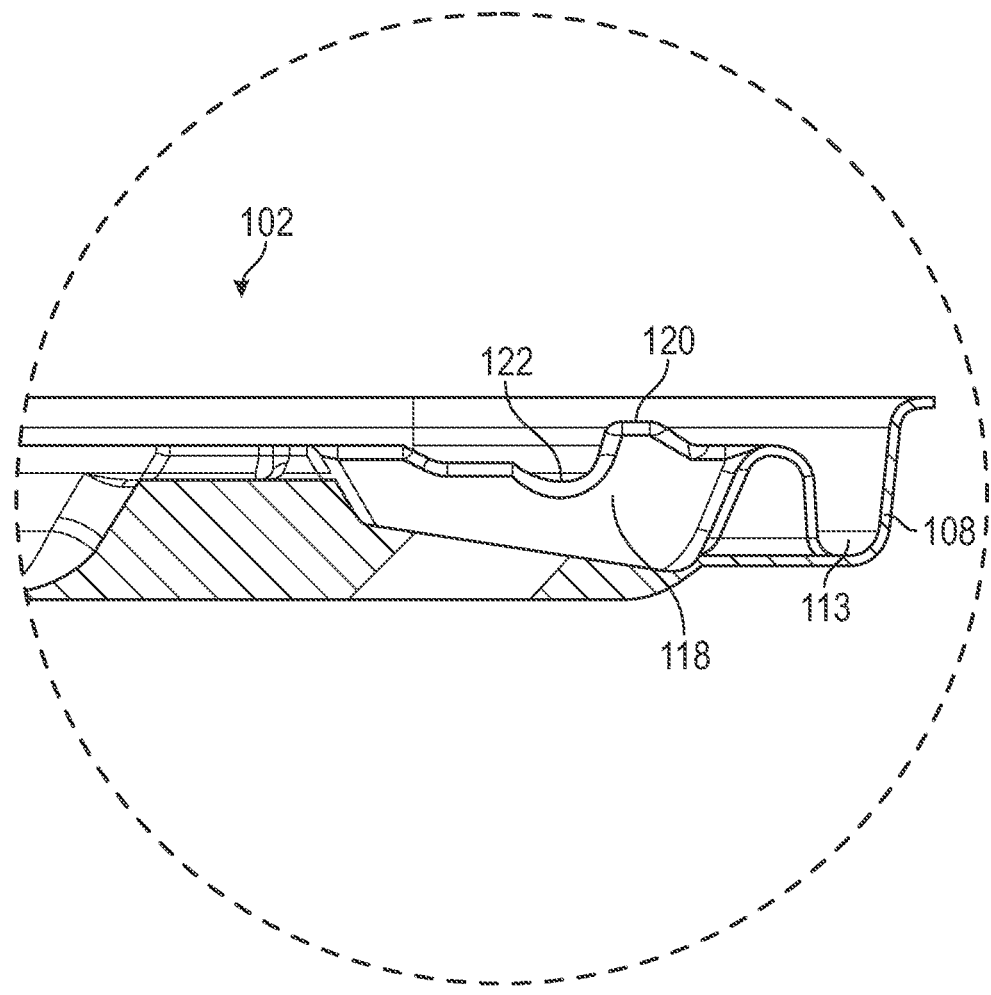
FIG. 5 is sectional view of a portion of the base of FIG. 1 taken from detail circle 5 in FIG. 4.

As best illustrated in FIGS. 2 and 3, the base 102 includes four supports 110A-D; however, in various other examples, any desired number of supports 110 may be utilized. Each support 110A-D includes a contact surface 112A-D that is configured to contact a peripheral region of the storage bag when the storage bag is positioned in the carrier 100. Each contact surface 112A-D has a slope, and the slopes may be the same or different for different contact surfaces.

As illustrated in FIGS. 2 and 3, in various embodiments, adjacent supports 110A-D are spaced apart by a gap 114 such that a portion of the peripheral region of the storage bag does not contact the supports 110A-D. The number of gaps 114 should not be considered limiting on the current disclosure. In the example of FIGS. 2 and 3, a gap 114 is provided between supports 110A and 110B, between supports 110B and 110C, between supports 110C and 110D, and between supports 110D and 110A. The gaps 114 may be configured to receive potential stress areas of the storage bag such that the storage bag is only held by the supports 110A-D at its strongest points. The gaps 114 may be configured to receive corners of the storage bag.

Figure 6:
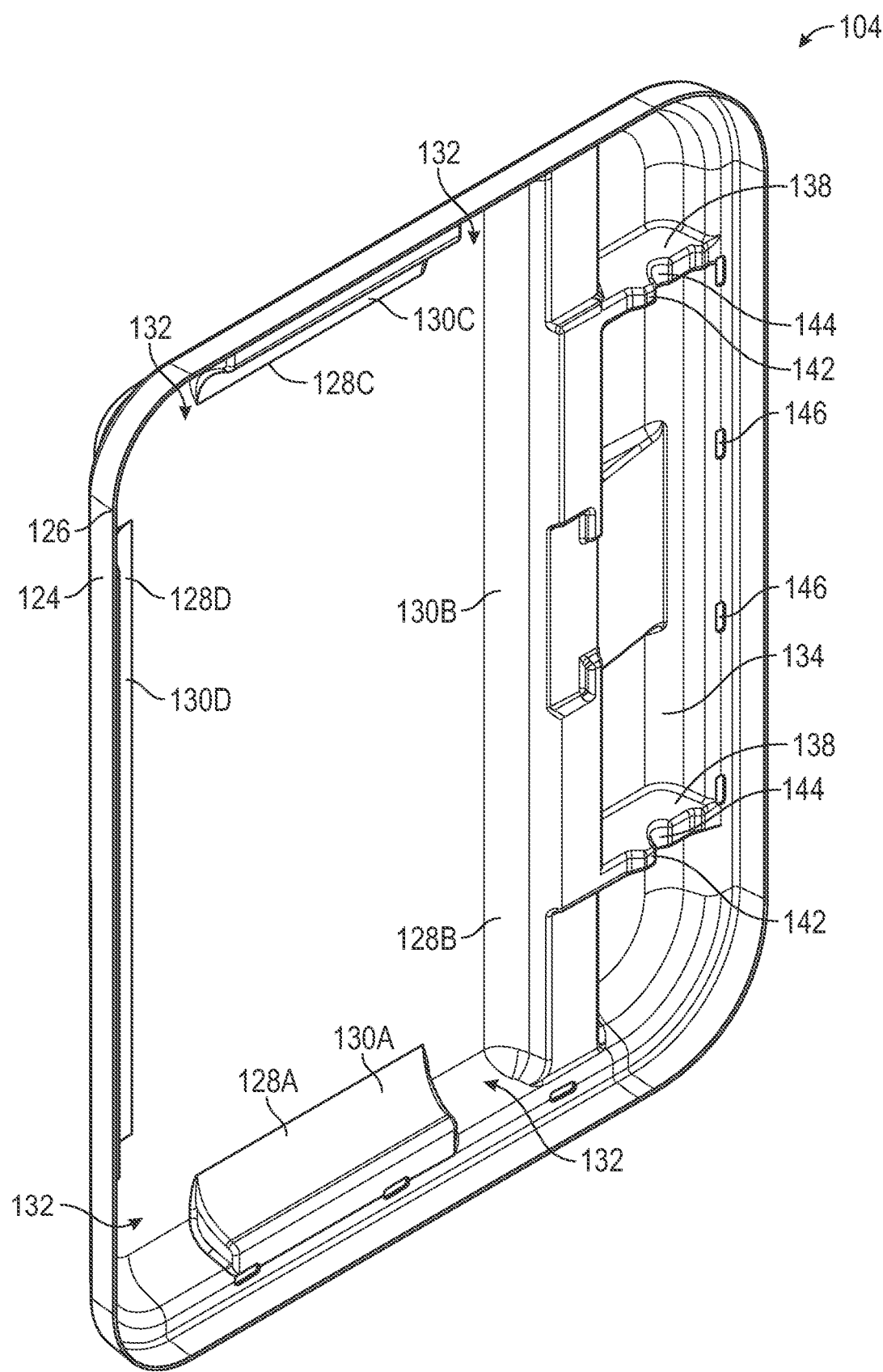
FIG. 6 is a perspective view of the lid of FIG. 1.

In the example illustrated in FIGS. 1-5, the base 102 includes a base channel portion 116. The base channel portion 116 is configured to contain one or more tubes of the storage bag within the carrier 100. As illustrated in FIG. 6, the lid 104 includes a lid channel portion 134. The base channel portion 116 and lid channel portion 134 together define a channel 136 that contains the tube(s) of the storage bag within the carrier 100.

In the example illustrated in FIGS. 1-5, the base 102 includes a base tube guiding portion 118. As described in detail below, in various embodiments, the base tube guiding portion 118 and a lid tube guiding portion 138 of the lid 104 together define a tube guide 140 that restricts motion of the tube(s) in the closed configuration. In the example illustrated in FIGS. 1-5, the base tube guiding portion 118 includes two peaks 120 and two depressions 122; however, in other examples, any desired number of peaks 120 and depressions 122 may be utilized.

Figure 7:
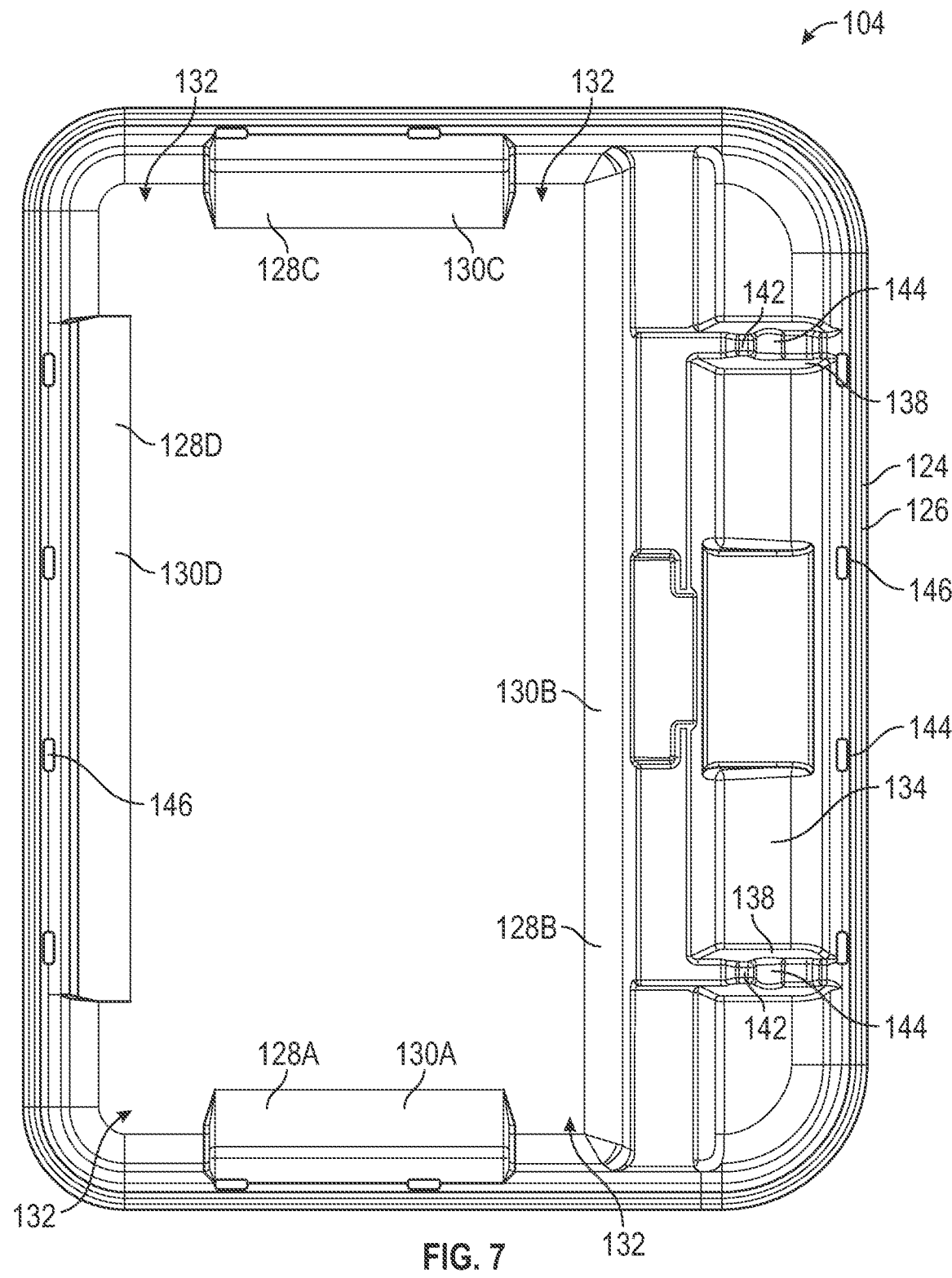
FIG. 7 is a bottom view of the lid of FIG. 1.

Referring to FIGS. 1, 6, and 7, similar to the base 102, the lid 104 includes the peripheral edge region 124 extending around a perimeter of the lid 104. In some examples, the peripheral edge region 124 optionally defines an edge 126. As illustrated in FIG. 1, when the base 102 and the lid 104 are in the closed configuration, the edge 126 of the lid 104 is aligned with the trough 113 of the base 102. As described in detail below, in some embodiments the peripheral edge region 124 of the lid 104 is positionable within the trough 113 when the base 102 and lid 104 are in the closed configuration, although it need not be depending on a position of the lid 104 and the base 102 in the closed configuration.

As illustrated in FIGS. 6 and 7, the lid 104 includes four supports 128A-D; however, in other examples, any desired number of supports 128 may be provided. In some examples, the number of supports 128 on the lid 104 are the same as the number of supports 110 on the base 102, although it need not be. Similar to the supports 110A-D, each support 128A-D includes a contact surface 130A-D that is configured to contact a peripheral region of the storage bag when the storage bag is positioned in the carrier 100. As shown, each contact surface 130A-D has a slope, and the slopes may be the same or different for different contact surfaces. The profile of the supports 128 may be similar to the profile of the supports 110, although it need not be.

Adjacent supports 128A-D are spaced apart by a gap 132, which is substantially similar to the gap 114, such that a portion of the peripheral region of the storage bag does not contact the supports 128A-D. The number of gaps 132 should not be considered limiting on the current disclosure. In some non-limiting examples, the gaps 132 are configured to receive corners of the storage bag.

In some examples, the lid 104 includes the lid channel portion 134 that is configured to contain one or more tubes of the storage bag within the carrier 100. In various examples, the base channel portion 116 and lid channel portion 134 together define the channel 136 that contains the tube(s) of the storage bag within the carrier 100.

As illustrated in FIGS. 6 and 7, similar to the base 102, the lid 104 includes the lid tube guiding portion 138. In the example illustrated in FIGS. 1-9, the lid tube guiding portion 138 includes two peaks 142 and two depressions 144; however, in other examples, any desired number of peaks 142 and depressions 144 may be utilized. The profile of the lid tube guiding portion 138 may be the same or different from a profile of the tube(s) of the storage bag. The shape of the lid tube guiding portion 138 is complimentary to the shape of the base tube guiding portion 118 such that when the lid 104 and base 102 are assembled, the peaks 142 of the lid tube guiding portion 138 are aligned with the depressions 122 of the base tube guiding portion 118 and the depressions 144 of the lid tube guiding portion 138 are aligned with the peaks 120 of the base tube guiding portion 118 (see, e.g., FIG. 1). In a closed configuration, the peaks 142 of the lid tube guiding portion 138 may contact the depressions 122 of the base tube guiding portion 118, and/or the depressions 144 of the lid tube guiding portion 138 may contact the peaks 120 of the base tube guiding portion 118, although they need not.

The base tube guiding portion 118 and the lid tube guiding portion 138 together define the tube guide 140 (see FIG. 1) that further restricts motion of the tube(s) in the closed configuration. The geometry or profile of the tube guide 140 may be the same or different from a geometry of the tube(s) of the storage bag. When the lid 104 and base 102 are assembled to define the tube guide 140, the base tube guiding portion 118 and the lid tube guiding portion 138 may contact each other, although they need not as described above. In various examples where the base tube guiding portion 118 and the lid tube guiding portion 138 are spaced apart, a gap defined between the base tube guiding portion 118 and the lid tube guiding portion 138 may be sized to prevent the tube(s) from becoming dislodged from the tube guide 140. In certain examples, the base tube guiding portion 118 and/or the lid tube guiding portion 138 may contact the tube(s) of the storage bag, although they need not.

Figure 8:
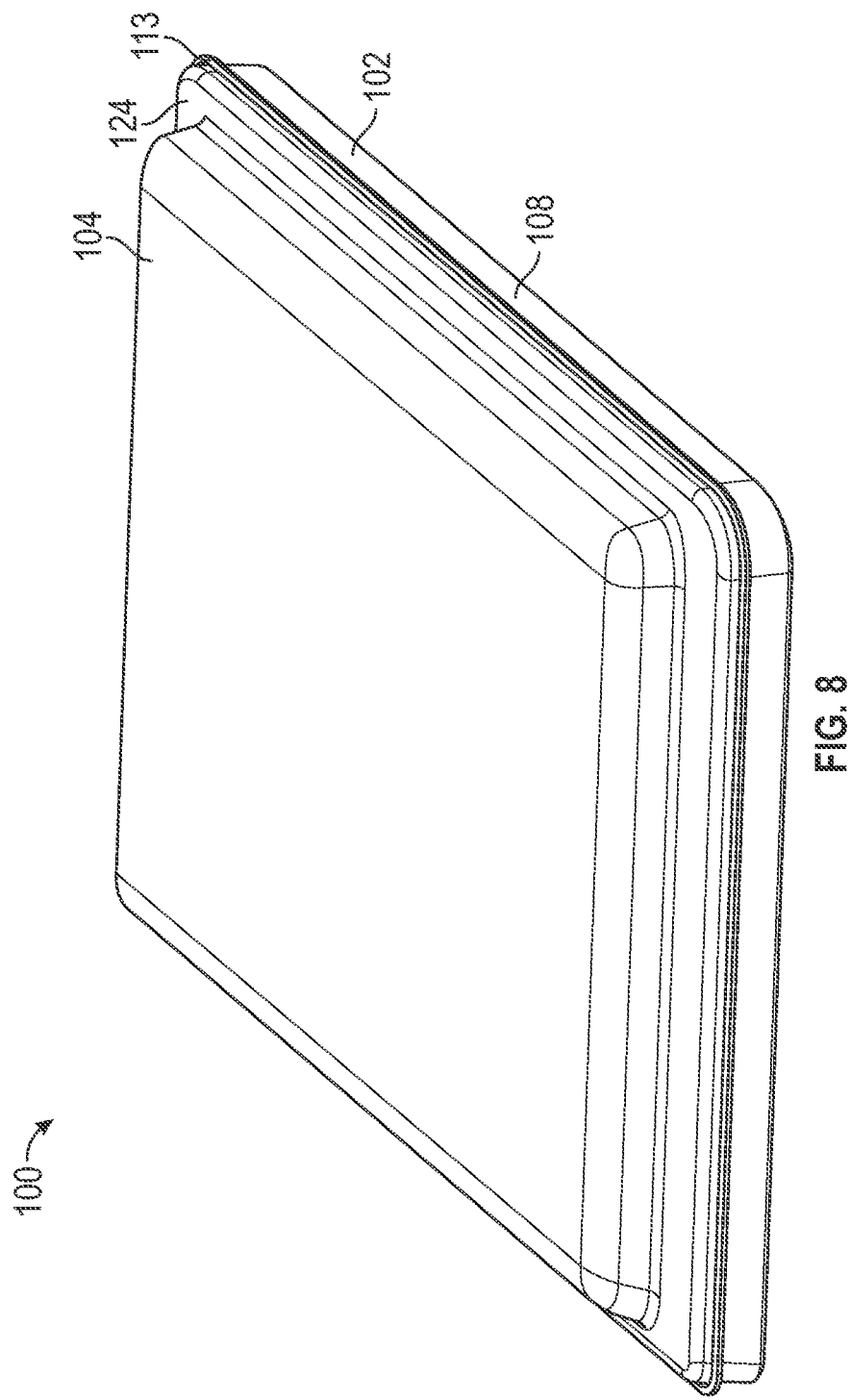
FIG. 8 is a perspective view of the carrier of FIG. 1.
Figure 9:
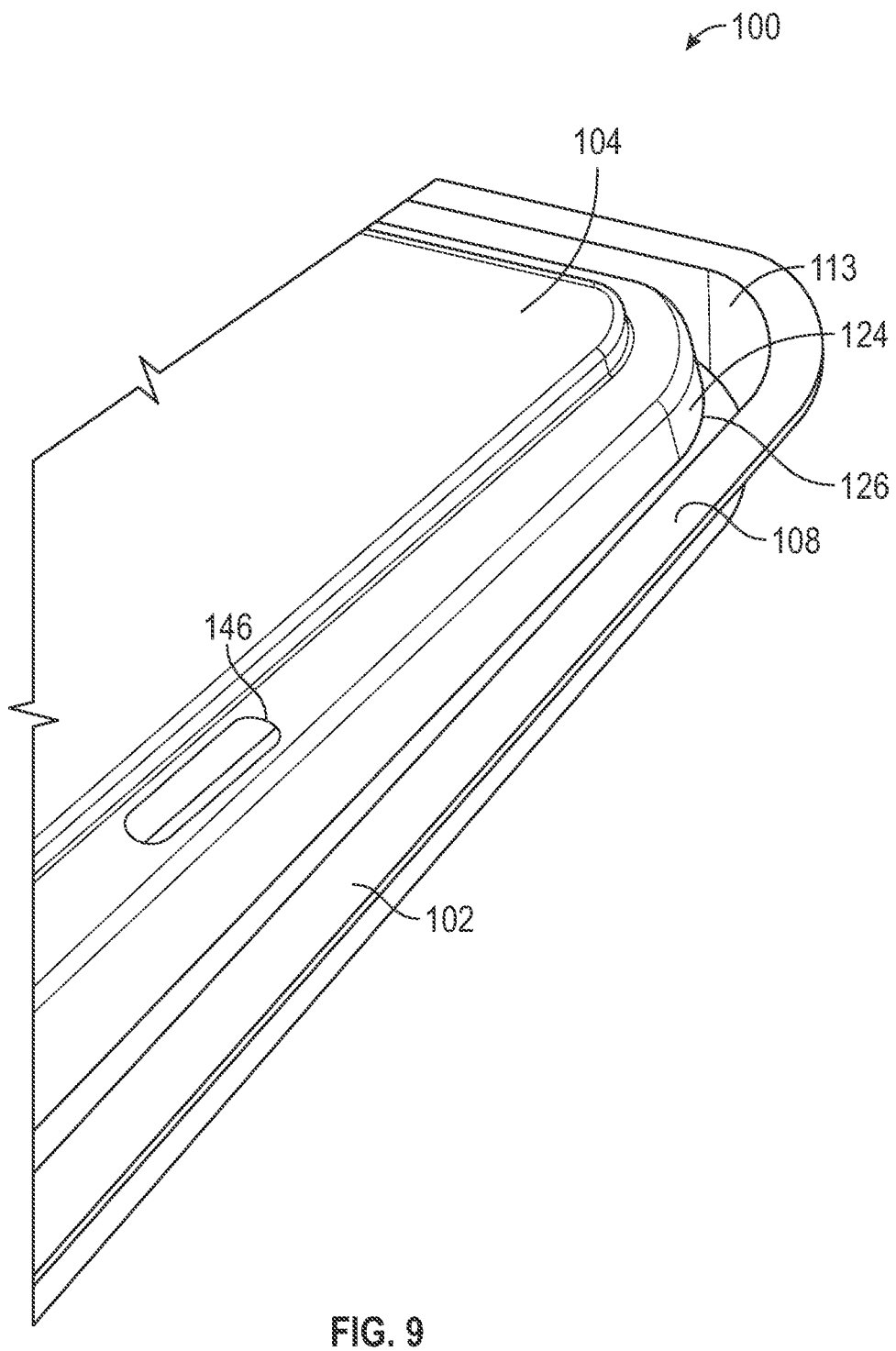
FIG. 9 is a perspective view of a portion of the carrier of FIG. 1.

Referring to FIGS. 1, 8, and 9, the base 102 and lid 104 are positionable in the closed configuration. In the closed configuration, the base 102 and lid 104 are adaptable between a contacting position and a floating position. In various aspects, in the contacting position, the peripheral edge region 108 of the base 102 contacts the peripheral edge region 124 of the lid 104. In one non-limiting example, in the contacting position, the edge 126 of the lid 104 contacts the trough 113 of the base 102. FIGS. 8 and 9 illustrate an example where the edge 126 of the lid 104 is positioned within the trough 113 of the base 102.

In some examples, an adjustable connecting system is provided to maintain the base and lid in the closed configuration while allowing the base and lid to be adaptable between the contacting position and the floating position. In some examples, the adjustable connecting system includes one or more apertures defined in the base and lid that can receive adjustable connecting members (not illustrated) for connecting the base to the lid. FIGS. 2, 3, 6, 7, 9, 10 and 11 show examples of apertures 146 in the base 102 and/or the lid 104. In some non-limiting examples, the adjustable connecting members include adjustable tie members, zip ties, wires, o-rings, or adjustable clamps, although in various other examples, various other suitable adjustable connecting members may be utilized.

Figure 10:
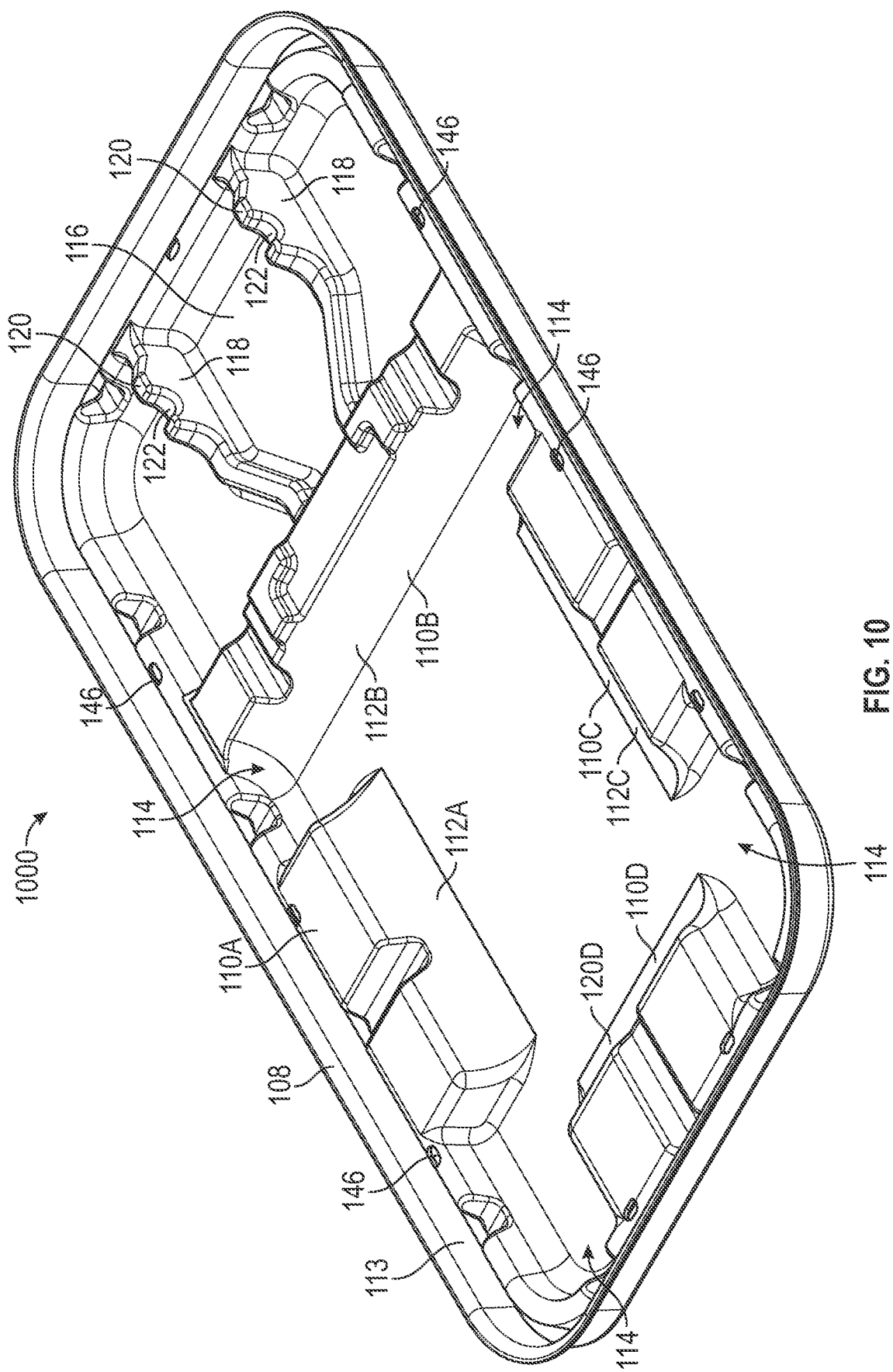
FIG. 10 is a perspective view of a base of a carrier according to embodiments described herein.
Figure 11:
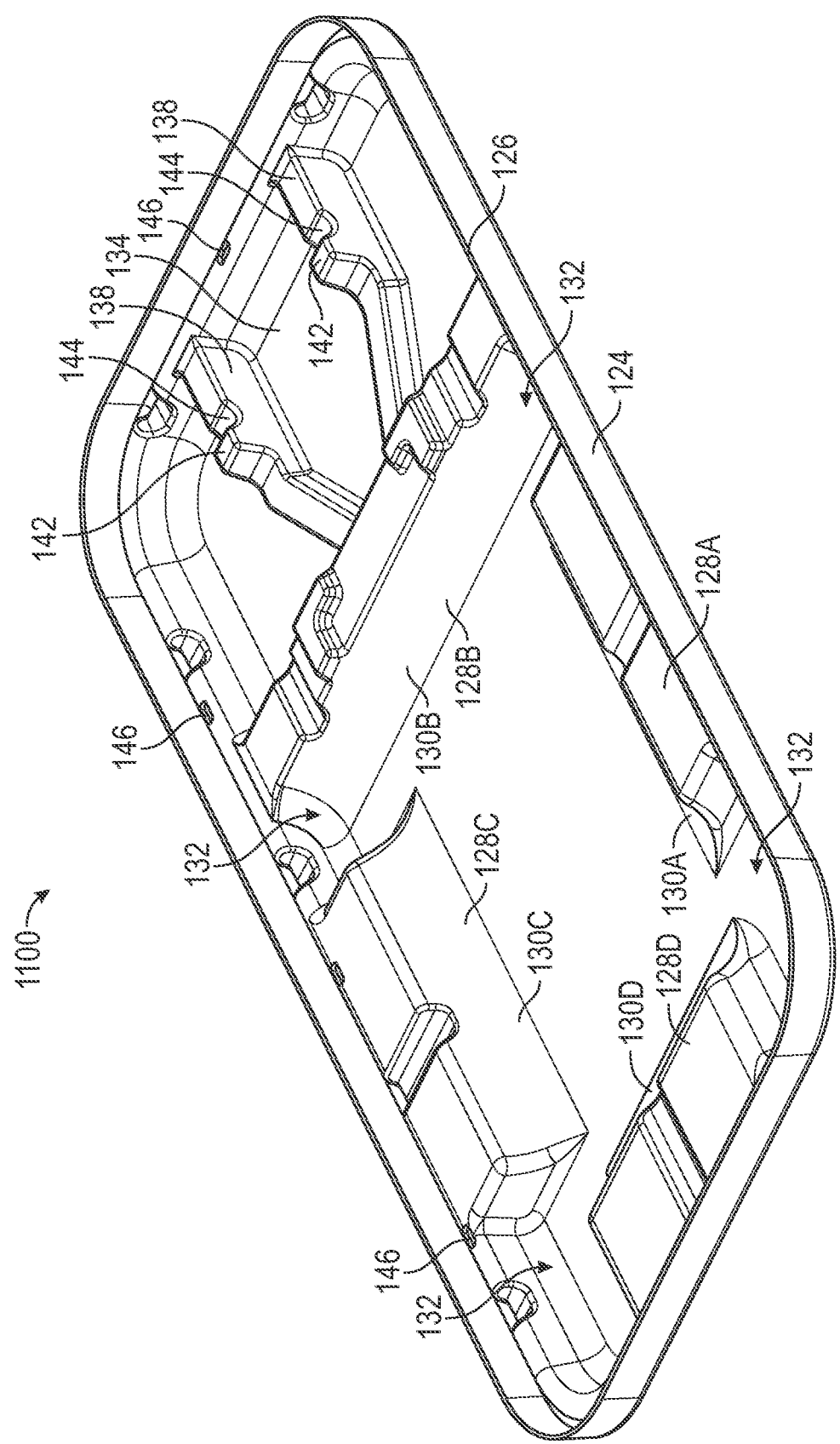
FIG. 11 is a perspective view of a lid for the base of FIG. 10.
Figure 12:
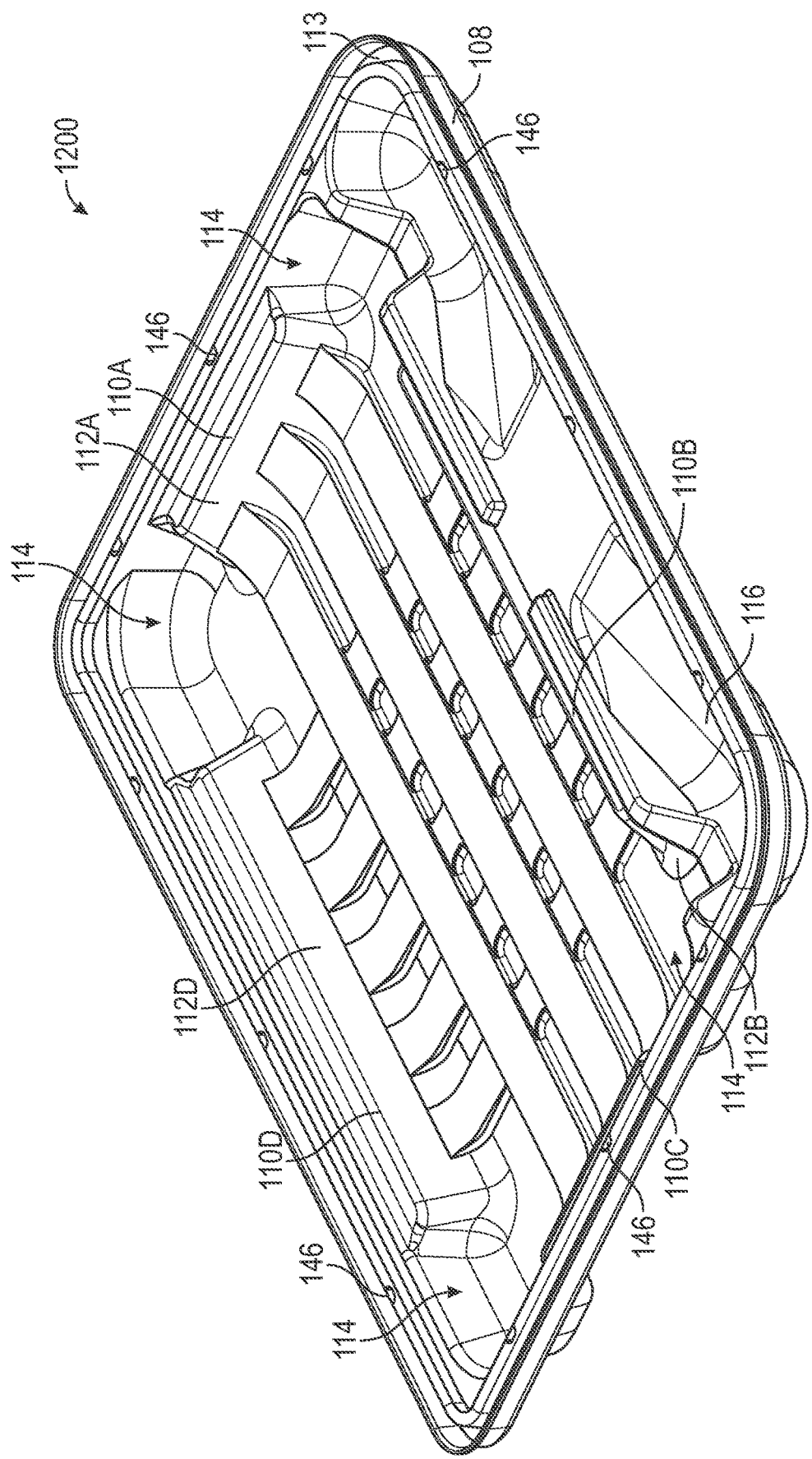
FIG. 12 is a perspective view of a base of a carrier according to embodiments described herein.
Figure 13:
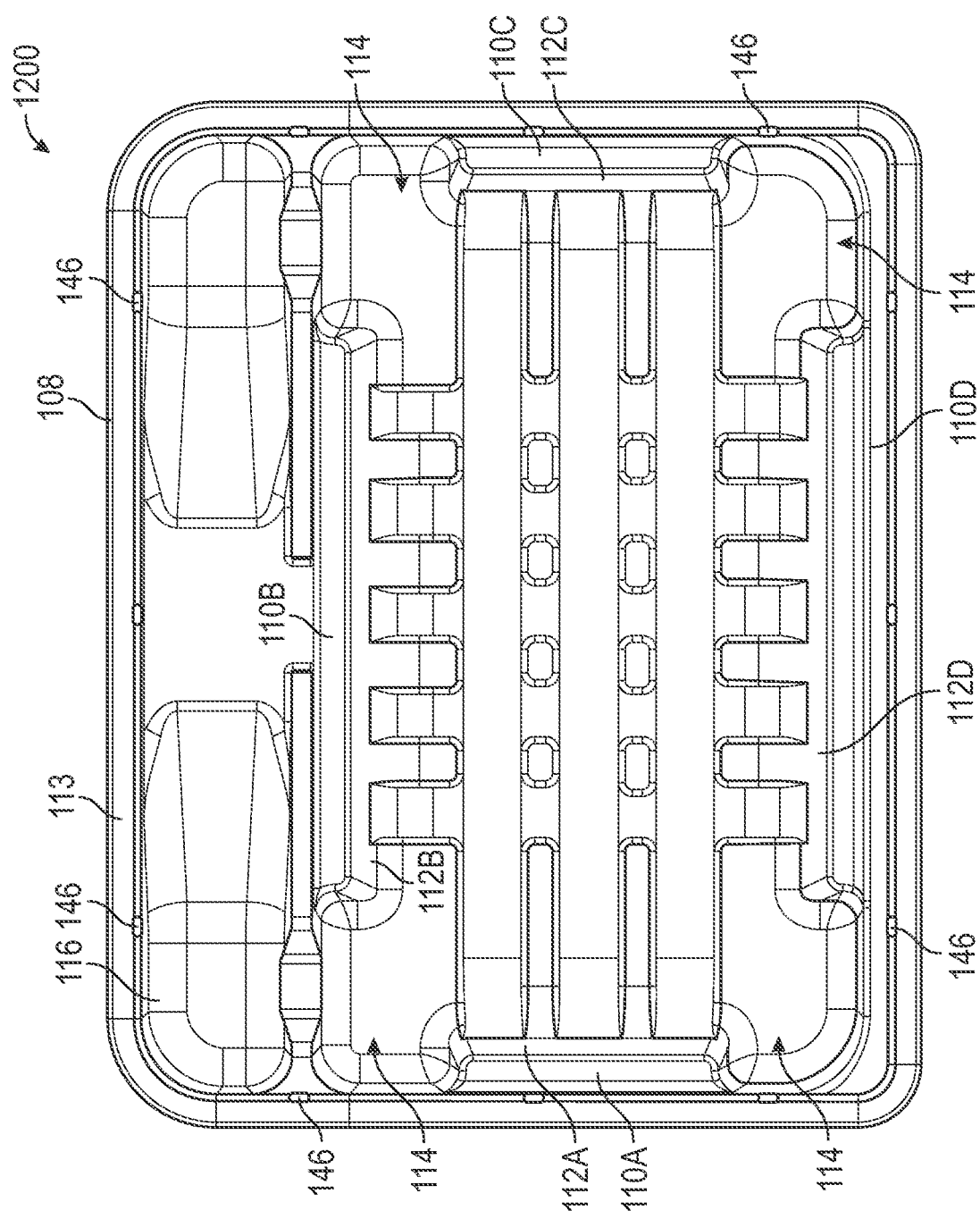
FIG. 13 is a top view of the base of FIG. 12.
Figure 14:
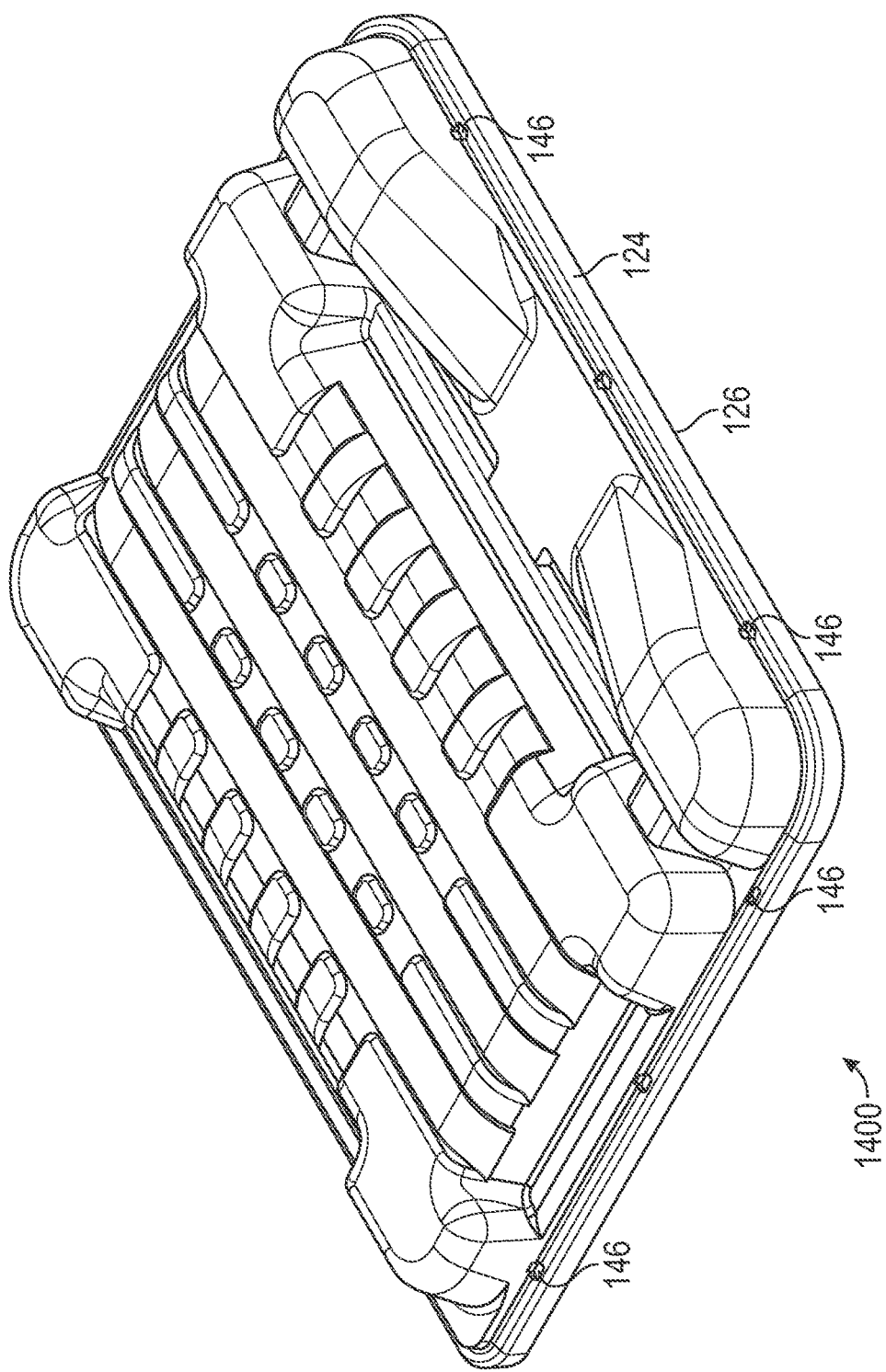
FIG. 14 is a perspective view of a lid for the base of FIG. 12.
Figure 15:
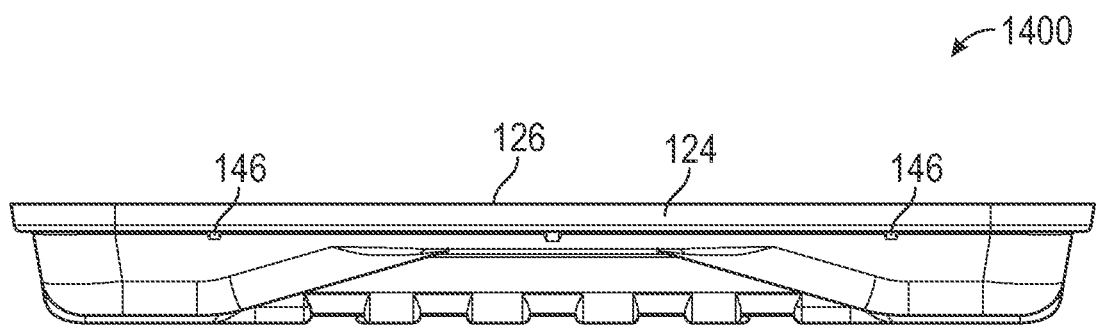
FIG. 15 is a side view of the lid of FIG. 14.

FIGS. 10 and 11 illustrate another example of a base 1000 (FIG. 10) and a lid 1100 (FIG. 11) of a carrier for a storage bag. Similar to the base 102, the base 1000 includes the trough 113, supports 110A-D, base channel portion 116, and base tube guiding portion 118. Similar to the lid 104, the lid 1100 includes the edge 126, supports 128A-D, lid channel portion 134, and lid tube guiding portion 138.

Figure 16:
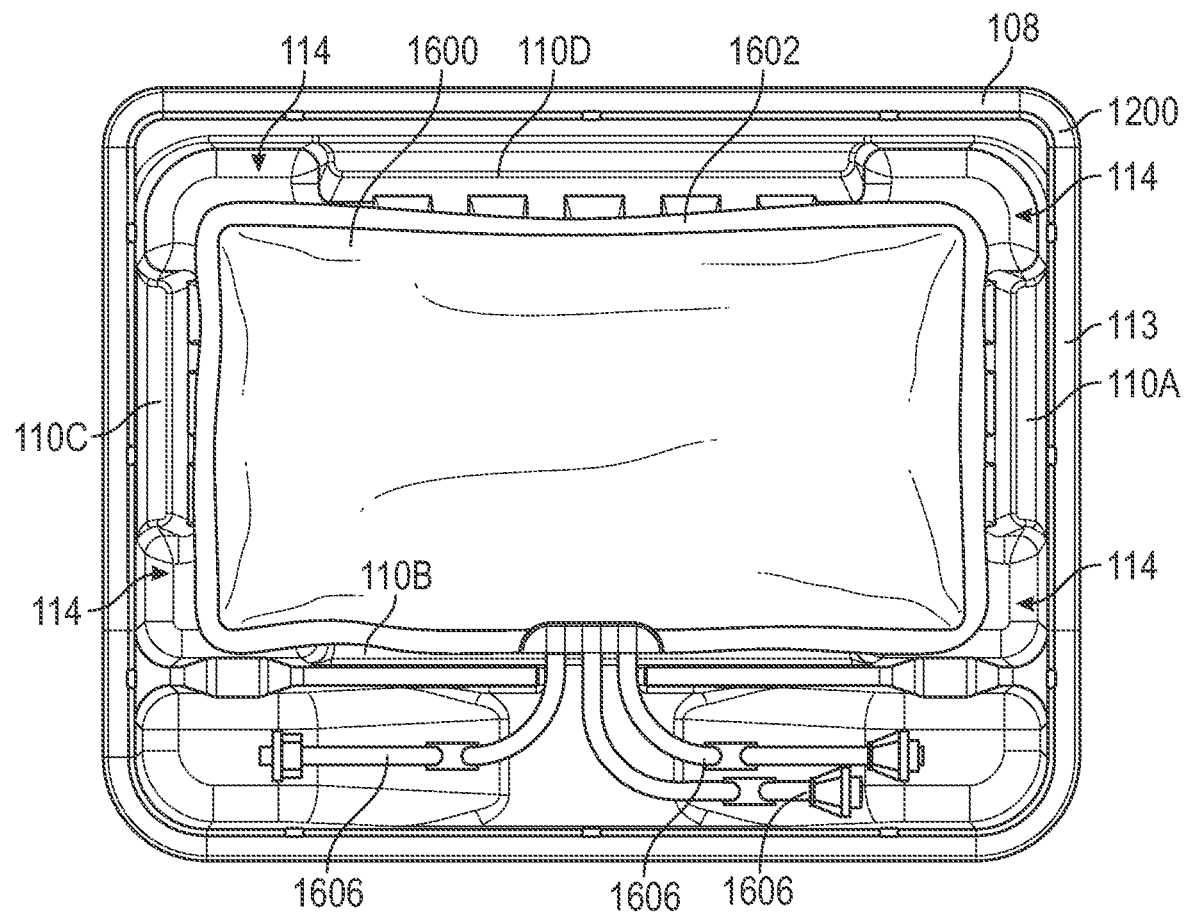
FIG. 16 is a top view of the base of FIG. 12 with a storage bag positioned therein.
Figure 17:
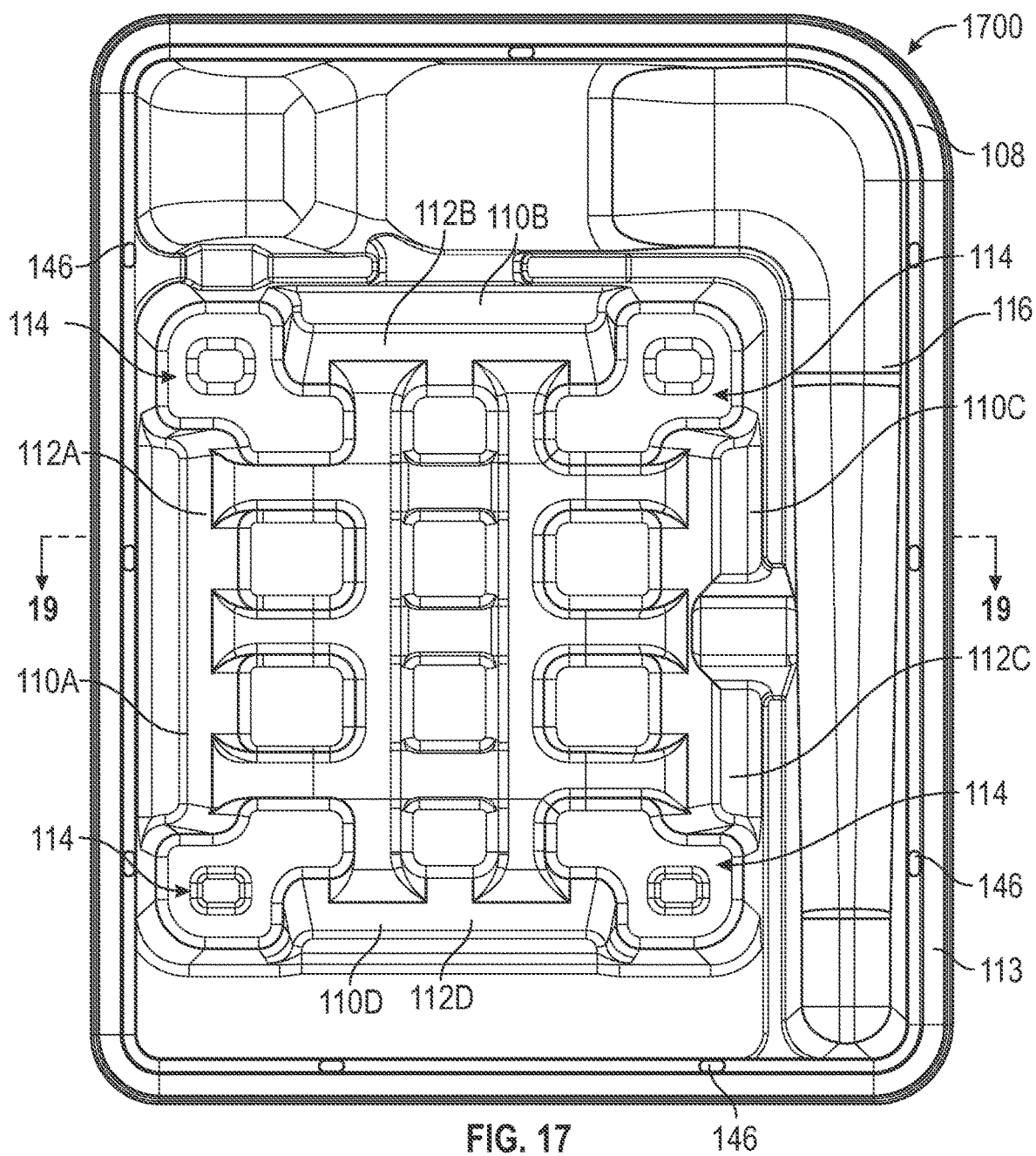
FIG. 17 is a top view of a base of a carrier according to embodiments described herein.
Figure 18:
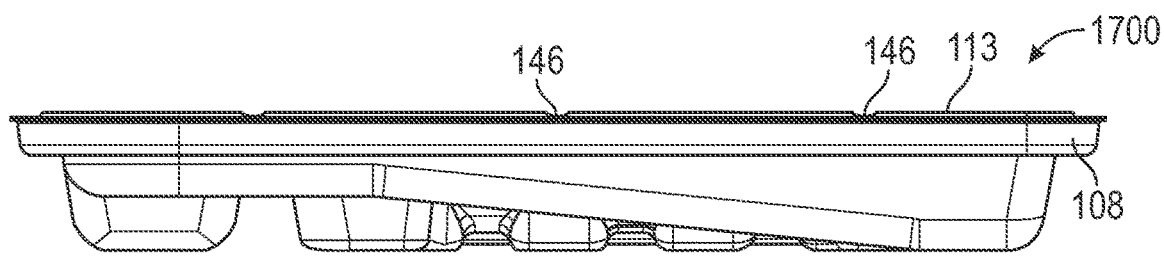
FIG. 18 is a side view of the base of FIG. 17.
Figure 19:
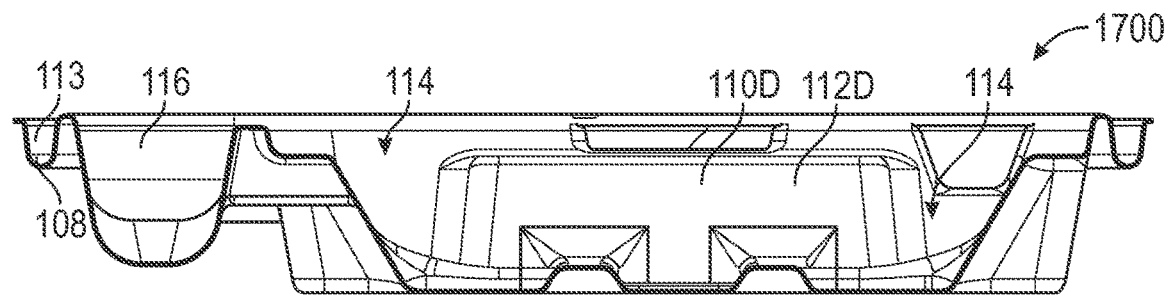
FIG. 19 is a sectional view of the base of FIG. 17 taken along line 19-19 in FIG. 17.
Figure 20:
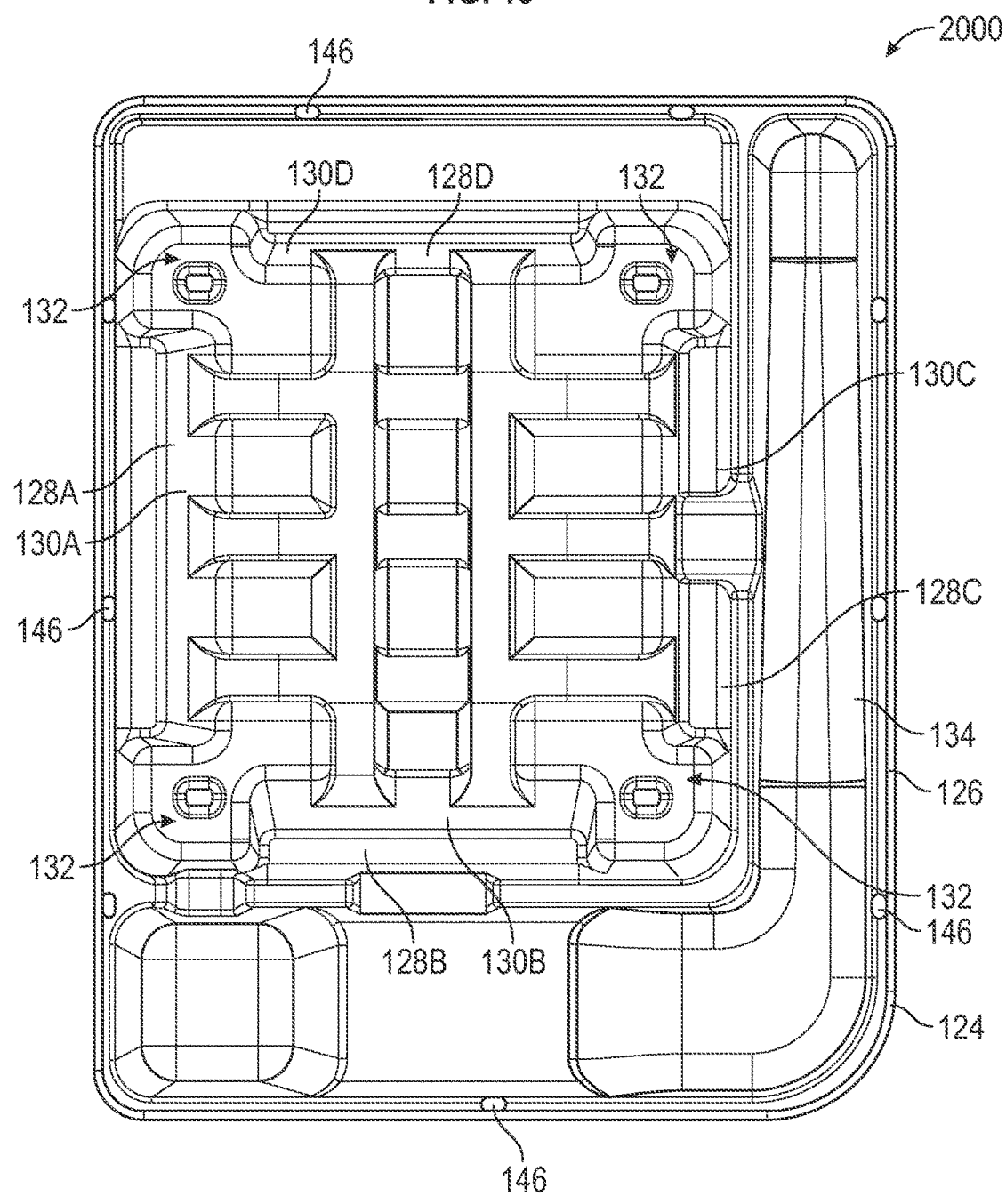
FIG. 20 is a bottom view of a lid for the base of FIG. 17.

FIGS. 12-16 illustrate another example of a base 1200 (FIGS. 12, 13 and 16) and lid 1400 (FIGS. 14 and 15) of a carrier for a storage bag 1600 (see FIG. 16). In this example, the base 1200 includes the trough 113, supports 110A-D, and base channel portion 116, but does not include the base tube guiding portion 118 compared to the base 102 (and the overall carrier does not include the tube guide 140). The lid 1400 includes the edge 126, supports 128, and lid channel portion 134, but does not include the lid tube guiding portion 138 compared to the lid 104. As illustrated in FIG. 16, the storage bag 1600 is positioned on the base 1200 such that portions of a peripheral region 1602 of the storage bag 1600 contact the supports 110 and portions of the peripheral region 1602 are in the gaps 114. Tubes 1606 of the storage bag 1600 are retained by the base channel portion 116 on the base 1200 and within the carrier when assembled with the lid 1100 and may extend in a variety of directions within the base channel portion 116. Although not illustrated, the lid 1400 is configured to engage the storage bag 1600 in a manner similar to that illustrated in FIG. 16.

Figure 21:
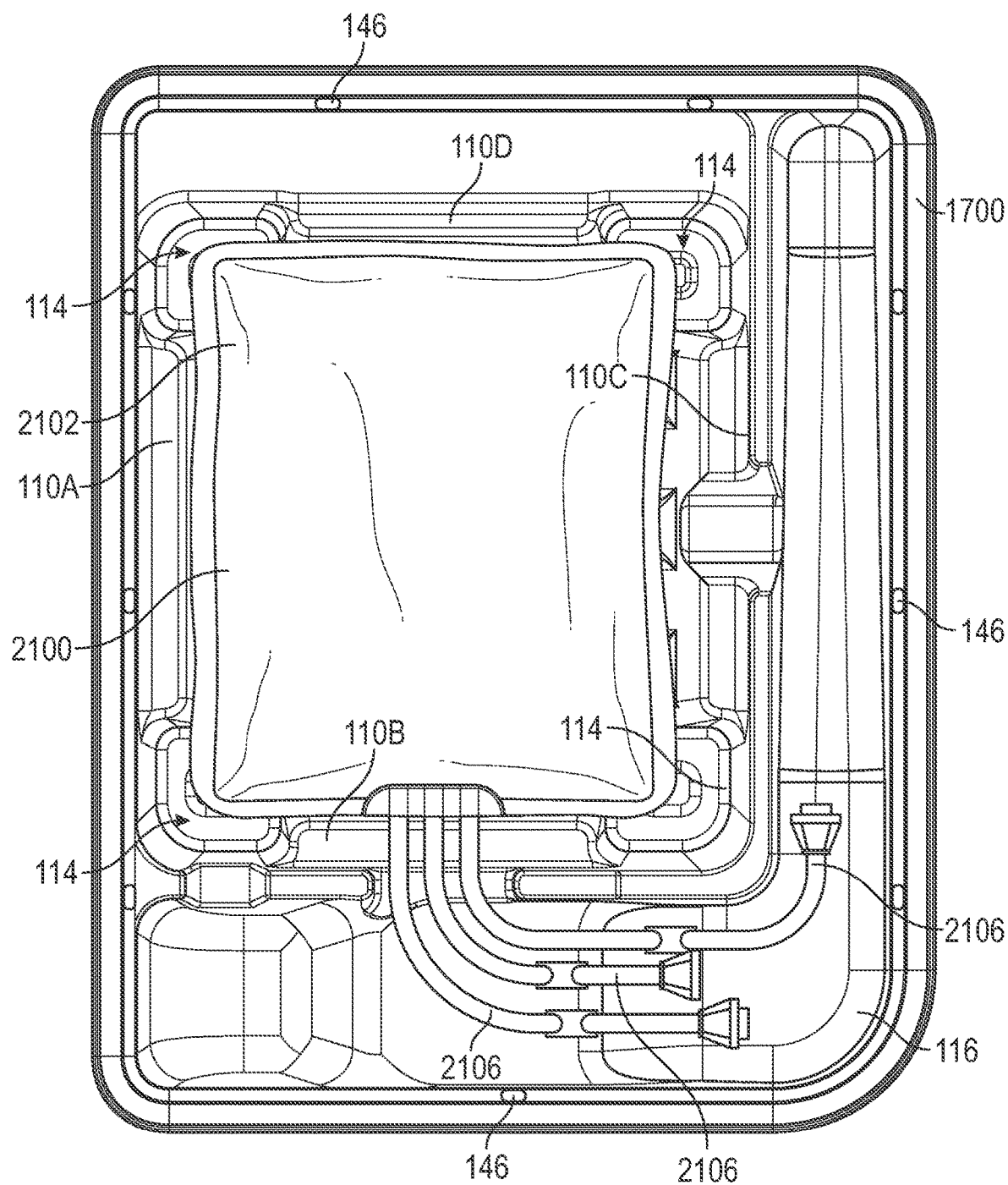
FIG. 21 is a top view of the base of FIG. 17 with a storage bag positioned therein.

FIGS. 17-21 illustrate another example of a base 1700 (FIGS. 17-19 and 21) and lid 2000 (FIG. 20) of a carrier for a storage bag 2100 (see FIG. 21). In this example, the base 1700 is similar to the base 1200 and includes the trough 113, supports 110, and base channel portion 116, but does not include the base tube guiding portion 118 (and the overall carrier does not include the tube guide 140). The lid 2000 is similar to the lid 1400 and includes the edge 126, supports 128A-D, and lid channel portion 134, but does not include the lid tube guiding portion 138 compared to the lid 104. As illustrated in FIG. 21, the storage bag 2100 is positioned on the base 1700 such that portions of a peripheral region 2102 of the storage bag 2100 contact the supports 110A-D and portions of the peripheral region 2102 are in the gaps 114. Tubes 2106 of the storage bag 2100 are retained by the base channel portion 116 on the base 1700 and within the carrier when assembled with the lid 1100. Compared to the base 1200, the base channel portion 116 directs the tubes 2106 in the same direction rather than a variety of directions. Although not illustrated, the lid 2000 is configured to engage the storage bag 2100 in a manner similar to that illustrated in FIG. 21.

In various examples, a method of protecting a storage bag with a carrier includes positioning the storage bag in the base of the carrier such that the storage bag contacts the base including the supports of the base. The method also includes positioning the tube(s) of the storage bag in the base channel portion. Optionally, the method includes positioning the tube(s) of the storage bag proximate the base tube guiding portion. The storage bag may contain a fluid when the bag is positioned in the base, or a fluid may be added to the bag after the bag is positioned in the base. In some embodiments, the bag may be partially filled before it is positioned in the base and additional fluid may be added after the bag is positioned in the base.

In some examples, the method includes positioning the lid and base in a closed configuration. Optionally, positioning the lid and base in the closed position includes moving the lid to the contacting position or the floating position. In various examples, positioning the lid and base in the closed configuration includes positioning the lid such that the storage bag contacts the lid including the supports of the lid. In some examples, positioning the lid and base in the closed configuration includes positioning the lid such that the tubes of the storage bag are within the lid channel portion and the tubes are thus retained within a channel of the carrier. Optionally, positioning the lid includes forming the tube guide with the lid tube guiding portion and the base tube guiding portion and positioning the tubes within the tube guide. In certain examples, after positioning the lid and base in the closed configuration, the method includes connecting the lid and the base through an adjustable connecting system.

The disclosure may be further defined by the following examples.

Example 1. A carrier for a storage bag including a base and a lid, where the base and lid each include two or more supports configured to contact a peripheral region of the storage bag to reduce stress at edges of the storage bag, and where a distance between the lid and base in the closed configuration is adaptable to a fill volume of the storage bag to allow for maximum contact of the storage bag with the base and lid in the closed configuration.

Example 2. The carrier of example 1, where the distance between the base and the lid is adaptable in the closed configuration between a contacting position and a floating position, where a peripheral edge region of the lid contacts a peripheral edge region of the base in the contacting position, and where the peripheral edge region of the lid is spaced apart from the peripheral edge region of the base in the floating position.

Example 3. The carrier of example 2, where one of the peripheral edge region of the base or the peripheral edge region of the lid includes a trough, and where the other of the peripheral edge region of the base or the peripheral edge region of the lid rests in the trough in the contacting position.

Example 4. The carrier of any one of examples 1-3, where each support includes a contact surface comprising a slope and configured to contact a peripheral region of the storage bag.

Example 5. The carrier of example 4, where a profile of each contact surface is arcuate shaped.

Example 6. The carrier of example 4 or example 5, where a profile of each contact surface is complimentary to a profile of a frozen storage bag.

Example 7. The carrier of any one of examples 1-6, where adjacent supports in the base are spaced apart by a gap such that a portion of the peripheral region of the storage bag does not contact the supports.

Example 8. The carrier of any one of examples 1-7, where the base and/or the lid further includes a channel configured to contain one or more tubes of a storage bag within the carrier in a closed configuration.

Example 9. The carrier of any one of examples 1-8, where the base further includes a base tube guiding portion and the lid further includes a lid tube guiding portion, where the base tube guiding portion and the lid tube guiding portion together define a tube guide for restricting motion of a tube in the closed configuration.

Example 10. The carrier of example 9, where a shape of the base tube guiding portion is complimentary to a shape of the lid tube guiding portion.

Example 11. The carrier of example 9 or example 10, where a geometry of the tube guide is different from a geometry of the tube.

Example 12. The carrier of any of examples 9-11, where the lid guiding portion and the base guiding portion each include at least one peak and at least one depression.

Example 13. The carrier of any one of examples 1-12, where the base and the lid each include high-density polyethylene.

Example 14. The carrier of any one of examples 1-13, further comprising two or more apertures for receiving adjustable connecting members for connecting the base to the lid.

Example 15. The carrier of example 14, where the adjustable connecting members include adjustable tie members.

Example 16. A carrier for a storage bag comprising: a base and a lid, where the base and the lid define an interior region in a closed configuration, where the lid and base are configured to retain tubes of a storage bag within the interior region in the closed configuration, and where a distance between the base and lid is adaptable in the closed configuration between a contacting position and a floating position.

Example 17. The carrier of example 16, further comprising a channel within the interior region, where the channel is configured to retain the tubes of the storage bag.

Example 18. The carrier of example 16 or example 17, where the base further includes a base tube guiding portion and the lid further includes a lid tube guiding portion, where the lid guiding portion and the base guiding portion together define a tube guide for restricting movement of a tube in the closed configuration.

Example 19. The carrier of example 18, where the lid tube guiding portion is spaced apart from the base tube guiding portion in the floating position, and where the lid tube guiding portion contacts the base tube guiding portion in the contacting position.

Example 20. The carrier of example 18 or example 19, where a geometry of the tube guide is different from a geometry of the tubes.

Example 21. The carrier of any of examples 16-20, where peripheral edge regions of the base and lid are spaced apart in the floating position, and where the peripheral edge regions of the base and lid are in contact in the contacting position.

Example 22. The carrier of any of examples 16-21, further comprising supports within the base having sloping contact surfaces configured to contact peripheral regions of the storage bag.

Example 23. The carrier of example 22, where adjacent supports are spaced apart by a gap such that a portion of the peripheral regions of the storage bag does not contact the supports.

Example 24. A method of protecting a storage bag at low temperature, the method comprising, maintaining a carrier of any preceding example in a closed configuration with the storage bag disposed therein, where the storage bag contains a liquid medium or a frozen medium; and controlling the temperature around the carrier, thereby causing the liquid medium to freeze, maintaining the frozen medium in a frozen state, or causing the frozen medium to thaw.

Example 25. The method of example 24, where the storage bag contains a liquid medium, and where controlling the temperature around the carrier includes lowering the temperature around the carrier to below a freezing point of the liquid medium and maintaining the temperature below the freezing point of the liquid medium until the liquid medium is frozen.

Example 26. The method of example 24, where the storage bag contains a frozen medium, and where controlling the temperature around the carrier includes raising the temperature around the carrier to a point above a melting point of the frozen medium and maintaining the temperature above the freezing point of the frozen medium until the frozen medium has thawed.

Example 27. A method of protecting a storage bag comprising positioning the storage bag in a base of a carrier of any preceding example where the storage bag contacts the base; positioning the base and a lid in a closed configuration, where the storage bag contacts the lid, and where the lid is in a contacting or a floating position; and connecting the lid and the base through an adjustable connecting system.

Example 28. The method of example 27, where the base includes two or more supports, and where the storage bag contacts the two or more supports at a peripheral region of the storage bag.

Example 29. The method of example 27 or 28, where the storage bag includes one or more tubes, where the base and lid form a channel, and where the method further includes positioning the tubes in the channel.

Example 30. The method of any of examples 27-29, where the storage bag includes one or more tubes, where the base and lid form a lid guide, and where the tubes are positioned proximate the tube guide.

Example 31. The method of any of examples 27-30, further comprising adding a fluid to the storage bag before or after the bag is positioned in the base of the carrier.

The compositions and methods of the appended claims are not limited in scope by the specific compositions and methods described herein, which are intended as illustrations of a few aspects of the claims and any compositions and methods that are functionally equivalent are within the scope of this disclosure. It should also be noted that the accompanying drawing figures referred to herein are not necessarily drawn to scale, but may be exaggerated to illustrate various aspects of the present disclosure, and in that regard, the figures should not be construed as limiting. Various modifications of the compositions and methods in addition to those shown and described herein are intended to fall within the scope of the appended claims. Further, while only certain representative compositions, methods, and aspects of these compositions and methods are specifically described, other compositions and methods are intended to fall within the scope of the appended claims. Thus, a combination of steps, elements, components, or constituents can be explicitly mentioned herein; however, all other combinations of steps, elements, components, and constituents are included, even though not explicitly stated.

That which is claimed:

1. A carrier for a storage bag comprising:
    a base and a lid,
        wherein the base and lid each comprise two or more supports configured to contact a peripheral region of a storage bag to reduce stress at edges of the storage bag,
        wherein a distance between the lid and base in the closed configuration is adaptable to a fill volume of the storage bag to allow for maximum contact of the storage bag with the base and lid in the closed configuration,
        wherein the distance between the base and the lid is adaptable in the closed configuration between a contacting position and a floating position,
        wherein a peripheral edge region of the lid contacts a peripheral edge region of the base in the contacting position, and
        wherein the peripheral edge region of the lid is spaced apart from the peripheral edge region of the base in the floating position.

2. The carrier of claim 1, wherein one of the peripheral edge region of the base or the peripheral edge region of the lid comprises a trough, and wherein the other of the peripheral edge region of the base or the peripheral edge region of the lid rests in the trough in the contacting position.

3. The carrier of claim 1, wherein each support comprises a contact surface comprising a slope and configured to contact a peripheral region of the storage bag.

4. The carrier of claim 3, wherein a profile of each contact surface is arcuate shaped.

5. The carrier of claim 1, wherein adjacent supports in the base are spaced apart by a gap such that a portion of the peripheral region of the storage bag does not contact the supports.

6. The carrier of claim 1, wherein the base and/or the lid further comprises a channel configured to contain one or more tubes of a storage bag within the carrier in the closed configuration.

7. The carrier of claim 1, wherein the base further comprises a base tube guiding portion and the lid further comprises a lid tube guiding portion, wherein the base tube guiding portion and the lid tube guiding portion together define a tube guide for restricting motion of a tube in the closed configuration.

8. The carrier of claim 7, wherein a shape of the base tube guiding portion is complimentary to a shape of the lid tube guiding portion.

9. The carrier of claim 7, wherein the lid guiding portion and the base guiding portion each comprise at least one peak and at least one depression.

10. The carrier of claim 1, wherein the base and the lid each comprise high-density polyethylene.

11. The carrier of claim 1, further comprising two or more apertures for receiving adjustable connecting members for connecting the base to the lid.

12. The carrier of claim 11, wherein the adjustable connecting members comprise adjustable tie members, zip ties, wires, o-rings, or adjustable clamps.

* * * * *